United States Patent
Ellis et al.

(10) Patent No.: US 11,032,410 B2
(45) Date of Patent: Jun. 8, 2021

(54) MOBILE DATA INSIGHT PLATFORMS FOR DATA ANALYSIS

(71) Applicant: Microsoft Technology Licensing, LLC, Redmond, WA (US)

(72) Inventors: Charles David Ellis, Seattle, WA (US); Dominique Fortier, Issaquah, WA (US); Liyin Xue, Kirkland, WA (US); Carlos Augusto Otero, Seattle, WA (US); Catherine William Neylan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 15/487,227

(22) Filed: Apr. 13, 2017

(65) Prior Publication Data
US 2018/0131803 A1 May 10, 2018

Related U.S. Application Data

(60) Provisional application No. 62/418,996, filed on Nov. 8, 2016.

(51) Int. Cl.
*H04M 1/725* (2021.01)
*G06F 3/0482* (2013.01)
(Continued)

(52) U.S. Cl.
CPC ...... *H04M 1/72448* (2021.01); *G06F 3/0482* (2013.01); *G06F 3/0483* (2013.01);
(Continued)

(58) Field of Classification Search
CPC ......... H04M 1/72563; H04M 1/72544; H04M 2250/22; H04M 1/72448; H04M 1/72427;
(Continued)

(56) References Cited

U.S. PATENT DOCUMENTS 7,299,406 B2  11/2007  Schnurr
8,082,489 B2  12/2011  Jiang
(Continued)

FOREIGN PATENT DOCUMENTS

WO  2015113301 A1  8/2015

OTHER PUBLICATIONS

"International Search Report and Written Opinion Issued in PCT Application No. PCT/US2017/060076", dated Jan. 3, 2018, 11 Pages.
(Continued)

*Primary Examiner* — Jennifer N To
*Assistant Examiner* — Parmanand D Patel

(57) ABSTRACT

Systems, methods, and software for mobile data visualization frameworks are provided herein. An exemplary method includes, determining data insight candidates for presentation on the mobile computing device that describe analysis of a target dataset, determined based at least on data analysis preferences associated with processing one or more past datasets, and where each of the data insight candidates includes at least one insight object directed to the target dataset and is described by object metadata that indicates at least a processing lineage used to produce the at least one insight object. The method includes selecting a presentation detail level for displaying the data insight candidates on the mobile computing device based at least on properties of the mobile computing device, and generating one or more insight views for presentation on the mobile computing device.

20 Claims, 10 Drawing Sheets

(51) Int. Cl.
*G09G 5/00* (2006.01)
*G06F 3/0483* (2013.01)
*H04M 1/72448* (2021.01)
*G06Q 10/06* (2012.01)
*G06F 40/18* (2020.01)
*G06F 40/106* (2020.01)
*H04M 1/72427* (2021.01)
*G06F 3/0488* (2013.01)

(52) U.S. Cl.
CPC ........ *G06F 3/04883* (2013.01); *G06F 40/106* (2020.01); *G06F 40/18* (2020.01); *G06Q 10/063* (2013.01); *G09G 5/005* (2013.01); *H04M 1/72427* (2021.01); *G09G 2340/0442* (2013.01); *G09G 2350/00* (2013.01); *G09G 2354/00* (2013.01); *G09G 2360/02* (2013.01); *G09G 2370/022* (2013.01); *G09G 2370/027* (2013.01); *G09G 2370/16* (2013.01); *H04M 2250/22* (2013.01)

(58) Field of Classification Search
CPC .... G06F 3/0482; G06F 17/212; G06F 17/246; G06F 3/0483; G06F 3/04883; G06F 40/18; G06F 40/106; G06Q 10/063; G09G 5/005; G09G 2370/16; G09G 2370/027; G09G 2350/00; G09G 2340/0442; G09G 2354/00; G09G 2360/02; G09G 2370/022
See application file for complete search history.

(56) References Cited

U.S. PATENT DOCUMENTS

| | | | |
|---|---|---|---|
| 8,745,506 | B2 | 6/2014 | Choudhary et al. |
| 9,213,472 | B2 | 12/2015 | Sorin |
| 9,304,672 | B2 | 4/2016 | Mital et al. |
| 9,418,336 | B2 | 8/2016 | Peev et al. |
| 2009/0327213 | A1 | 12/2009 | Choudhary |
| 2010/0042484 | A1* | 2/2010 | Sipes ................. G06Q 30/0241 705/14.4 |
| 2010/0138780 | A1* | 6/2010 | Marano ................. G06F 3/1415 715/804 |
| 2011/0205231 | A1* | 8/2011 | Hartley ................. G06Q 40/00 345/440 |
| 2012/0268553 | A1* | 10/2012 | Talukder ............. H04L 12/1818 348/14.08 |
| 2013/0038612 | A1* | 2/2013 | Hanumara ............. G06Q 30/02 345/440 |
| 2013/0332810 | A1 | 12/2013 | Lin et al. |
| 2014/0172885 | A1 | 6/2014 | Sekharan |
| 2014/0236663 | A1 | 8/2014 | Smith et al. |
| 2014/0282230 | A1* | 9/2014 | Sorin ................. G06F 3/04886 715/790 |
| 2015/0113377 | A1 | 4/2015 | Fu et al. |
| 2015/0193094 | A1* | 7/2015 | Armitage ............. G06F 16/904 715/825 |
| 2015/0212715 | A1 | 7/2015 | Singhal et al. |
| 2015/0379108 | A1 | 12/2015 | Mital et al. |
| 2016/0117308 | A1 | 4/2016 | Haider et al. |
| 2016/0203217 | A1 | 7/2016 | Anisingaraju et al. |
| 2016/0253340 | A1* | 9/2016 | Barth .................... G06F 16/148 707/756 |
| 2017/0177559 | A1* | 6/2017 | Dang ................. G06Q 30/0201 |

OTHER PUBLICATIONS

"Your planning, budgeting, forecasting, analysis and scorecarding cloud solution", http://web.archive.org/web/20151027010600/http://www-03.ibm.com/software/products/en/planning-analytics/, Published on: Oct. 27, 2015, 2 pages.

Flood, et al., "Spreadsheets on the Move: An Evaluation of Mobile Spreadsheets", In Journal of the Computing Research Repository, Dec. 2011, 12 pages.

"Easy Data Preparation and Analytics for Any Data", http://web.archive.org/web/20151229012924/http://www.sisense.com/product/, Published on: Dec. 29, 2015, 5 pages.

"Office Action Issued in European Patent Application No. 17805337.7", dated Jan. 12, 2021, 6 Pages.

\* cited by examiner

MOBILE DATA INSIGHT PLATFORMS FOR DATA ANALYSIS

RELATED APPLICATIONS

This application hereby claims the benefit of and priority to U.S. Provisional Patent Application 62/418,996, titled "MOBILE DATA INSIGHT PLATFORMS FOR DATA ANALYSIS," filed Nov. 8, 2016, which is hereby incorporated by reference in its entirety.

BACKGROUND

Various user productivity applications allow for data entry and analysis. These applications can provide for data creation, editing, and analysis using spreadsheets, presentations, documents, messaging, or other user activities. Users can store data files associated with usage of these productivity applications on various distributed or cloud storage systems so that the data files can be accessible wherever a suitable network connection is available. In this way, a flexible and portable user productivity application suite can be provided.

However, the information technology industry has continually increased the amount of information as well as the quantity of sources of information. Users can be quickly overwhelmed with data analysis due to the sheer quantity of data or number of options available for managing and presenting the data and associated analysis conclusions. Moreover, users within an organization have a difficult time leveraging the data and analysis of co-workers, and leveraging data analysis while switching between small form-factor devices (such as smartphones and tablet computers) and large form-factor devices (such as desktop computers).

OVERVIEW

Systems, methods, and software for mobile data visualization frameworks are provided herein. An exemplary method includes, determining data insight candidates for presentation on the mobile computing device that describe analysis of a target dataset, determined based at least on data analysis preferences associated with processing one or more past datasets, and where each of the data insight candidates includes at least one insight object directed to the target dataset and is described by object metadata that indicates at least a processing lineage used to produce the at least one insight object. The method includes selecting a presentation detail level for displaying the data insight candidates on the mobile computing device based at least on properties of the mobile computing device, and generating one or more insight views for presentation on the mobile computing device.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
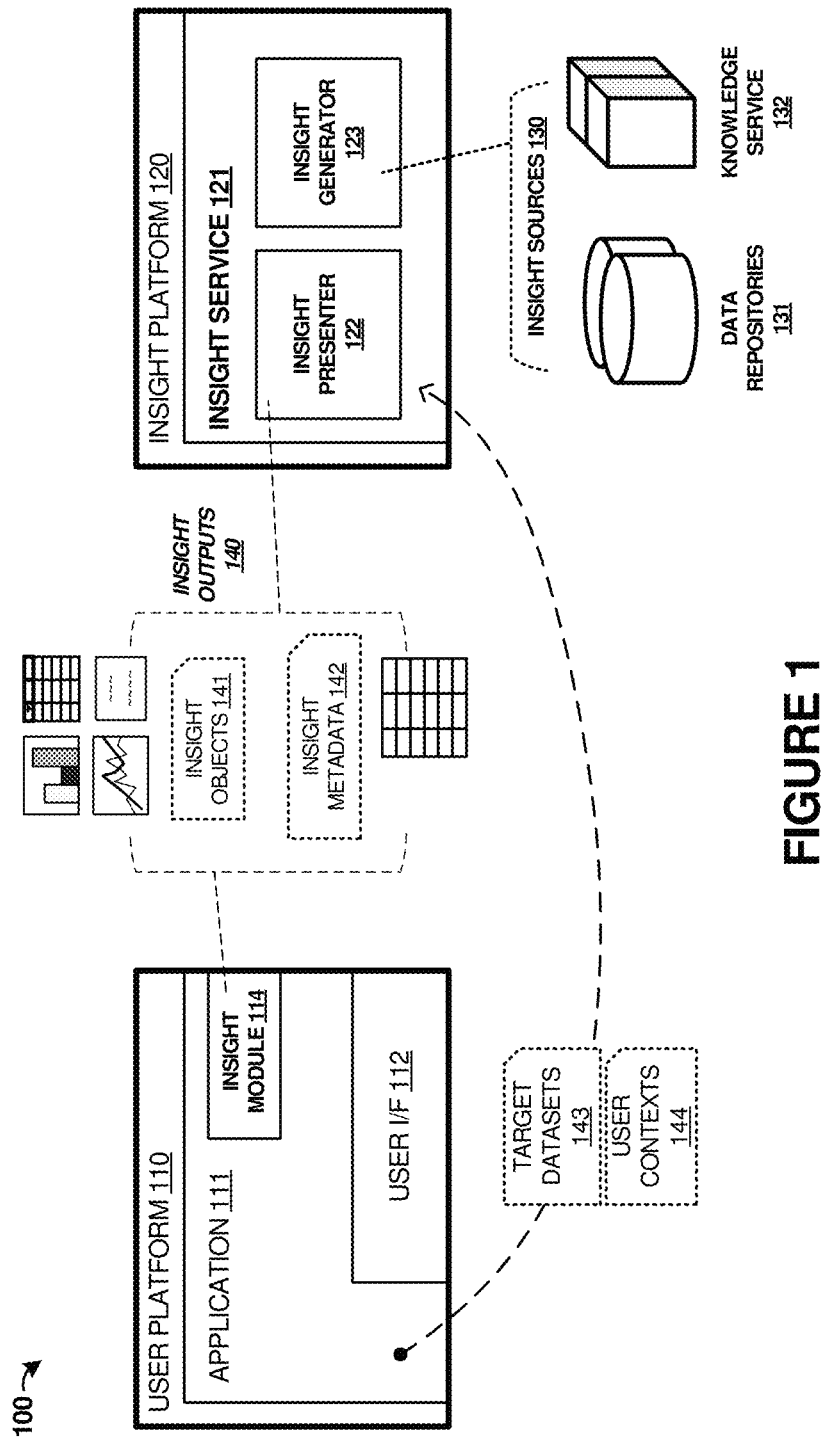
FIG. 1 illustrates a data insight environment in an example.

User productivity applications provide for user data creation, editing, and analysis using spreadsheets, slides, documents, messaging, or other application activities. However, due in part to continually increasing amounts of user data as well as the quantity of different sources of information, users can be quickly overwhelmed with tasks related to analyzing this data. In workplace environments, such as a company or other organization, users might have a difficult time leveraging the data and analysis performed by other co-workers. Moreover, as portable and mobile devices have become more popular, it can be difficult for users to view and analyze data on small form-factor displays.

This level of growth in data analysis increases a need to augment a user ability to make sense and use increasing sources and volumes of data. Specifically, organizational and tribal knowledge related to data analysis that occurs inside these organizations can provide information that other users can apply to further data analysis. However, it can be very difficult to make this information available to other users without requiring costly and highly manual actions, such as scheduling a meeting with many people to exchange knowledge.

As mentioned above, it can be challenging to understand and visualize data in spreadsheet or other environments. Moreover, data analyses might be performed often by a user or within an organization and these data analyses can be applied to new datasets, such as product sales figures that continue to be updated. It can be important to understand how data changes and what has changed of importance in the datasets. These changes can be used to form reports, dashboards, or summary spreadsheets as well as various insight objects. These objects and other insight outputs can be updated regularly and responsive to user data changes and additions, such as on a daily, weekly, or monthly basis. As datasets become more broad and incorporate more sources of data, then analysis can be more difficult, and these insight outputs can become advantageous for users. Automatic insights can be generated that are tailored to the data styles, usage modalities, and particular data 'languages' used by a user or organization. As will be discussed below, an insight service and activity signal service can employ signals from past documents, data analyses, and application telemetry to learn user or organizational preferences that are used to present insight objects.

The examples herein can leverage various sources of data and organizational knowledge to improve the ability of users to analyze and digest data within various data visualization environments. For example, by processing activity signals related to how users typically perform data analyses and which preferences the users use in communicating analyses, the implementations herein can infer higher level knowledge and establish cross-document and cross-organizational improvements and efficiencies. By making these inferences available to many different users, potentially in the form of a knowledge graph, the examples herein can make this knowledge available to the users. The advantages are many, such as jump-starting new analysis from an existing analysis, accelerating the iterative analysis process by prioritizing, assisting users in avoiding pitfalls, and improving/harmonizing communications among users.

Moreover, this knowledge can be leveraged in various data visualization environments to create insight objects for users during data analysis stages. Insight objects can be an extension of analytic objects that include charts, pivot tables, tables, graphs, and the like. Insight objects can include further content that represents an insight, such as summary verbiage, paragraphs, graphs, charts, pivot tables, data tables, or pictures that are generated for users which indicate key takeaways from the data. Insight objects can also include a rich set of processing lineage data associated therewith that includes an active record of data processing steps, transformations, or other processes that were used to form the insight objects and summary verbiage. By including the processing lineage with insight objects, portability across various form factors and devices can be enhanced.

Turning now to a first example system for data visualization and insight object generation, FIG. 1 is presented. FIG. 1 illustrates data visualization environment 100. Environment 100 includes user platforms 110, insight platform 120, and insight sources 130. Each of the elements of environment 100 can communicate over one or more communication links, which can comprise physical and logical network links, among others.

User platform 110 provides user interface 112 to application 111. Application 111 can comprise a user productivity application for use by an end user in data creation, analysis, and presentation. For example, application 111 might comprise a spreadsheet, word processor, database, or presentation application. User platform 110 also includes insight module 114. Insight module 114 can interface with insight platform 120 as well as provide insight services within application 111. User interface 112 can include graphical user interfaces, console interfaces, web interfaces, text interfaces, among others.

Insight platform 120 provides insight services, such as insight service 121. Insight service 121 includes insight presenter 122 and insight generator 123. Insight service 121 can process one or more datasets to establish data insight objects, referred to as insight objects, that can include graphical visualization portions, data descriptions or conclusions/summaries, object metadata, as well as the underlying datasets. Insight objects can comprise an object insight portion for presentation to a user and an object metadata portion that indicates at least a processing lineage used to produce the data insight object.

Insight objects include extensions of typical analytic objects, such as charts, graphs, tables, pivot tables, data descriptions, and other data or document presentation elements. Insight objects 141 can include other content that represents the insight objects, such as verbiage or summary statements that provide additional information to a user, such a key takeaways of data insight analysis, and other data descriptions. Furthermore, insight objects can have insight metadata 142 that indicates a processing lineage used to produce the insight objects. This insight metadata provides for a portable and flexible indication of the processes, analyses, and other functions that were used in the production of the insights. The processing lineage can be applied as needed to produce data insight objects for presentation by an insight interface, such as when new or changed datasets are established. The changed or new data can have the same processing lineage applied to establish an insight object that reflects the changes or additions in dataset content.

Insight sources 130 can include various local and distributed data storage elements that contain user data, derived user knowledge and activity signals, among other information. In FIG. 1, data repositories 131 include various data storage elements that can comprise distributed or cloud data storage services and elements, data storage devices, data storage interfaces, among other data sources that can store user data of user platform 110 or user data associated with other users, platforms, and organizational entities.

In operation, a user of user platform 110 or application 111 might indicate a set of data or target dataset for which data analysis is desired. This data analysis can include traditional data analysis such as math functions, static graphing of data, pivoting within pivot tables, or other analysis. However, in the examples herein, an enhanced form of data analysis is performed, namely insight analysis. At the user application level, one or more insight modules are included to not only present insight analysis options to the user but also interface with insight platform 120 which performs the insight analysis, among other functions. Upon designation of one or more target datasets, a user can employ insight service 121 to process the target datasets and generate one or more candidate insights, insight objects, and associated insight metadata. In FIG. 1, this process is shown using target datasets 143 supplied by application 111. However, it should be understood that target datasets can be supplied from other data sources, including in-application data sources, data documents, data storage elements, distributed data storage systems, or other data sources, such as data repositories 131.

User contexts 144 can also be provided by application 111 or other elements of user platform 110. User contexts 144 can indicate various properties about user platform 110, user interface 112, or user identities, among other information. For example, user contexts 144 can indicate an application type or name that a user is currently interfacing with on user platform 110. User contexts 144 can indicate activities or actions currently being performed by the user on user platform 110 or within application 111 via user interface 112 or insight module 114. In other examples, user contexts 144 can indicate properties of user platform 110 or a user device or devices on which user platform 110 is being provided or executed, such as indicating a mobile device type, desktop or non-mobile device type, or other properties—such as those indicated below for mobile characteristics 340 in FIG. 3.

Insight service 121 establishes content of the data insight candidates according to at least a target dataset and data analysis preferences derived in part from past usage modalities, where the content of each of the data insight candidates includes at least one data insight object described by object metadata that indicates a processing lineage used to produce the at least one data insight object. Based at least on receiving a user selection of a first data insight candidate among a listing of the data insight candidates presented in the insight interface, insight service 121 produces the first data insight candidate for inclusion in a user interface to the user application, such as for inclusion into a spreadsheet canvas of a spreadsheet application. Object metadata is configured to accompany the at least one data insight object when the at least one data insight object is embedded into a document associated with another user application from the user application in which the target dataset is identified.

To determine the data insight candidates comprising data insight objects and other insight information, various insight sources are employed. These insight sources can be used to establish data analysis preferences derived from past user activity, application usage modalities, organizational traditions with regard to data analysis, individualized data processing techniques, or other activity signals. Knowledge service 132, for example, can develop a repository of user or organizational knowledge based on past usage of applications or past analyses of data, among other factors. Knowledge graphing or graph analysis can be employed to identify key processes or data analysis techniques that can be employed in the associated insight analysis. Knowledge repositories can be established to store these data analysis preferences and organizational knowledge for later use by users employing the insight services discussed herein. In some examples, data repositories 131 can include knowledge repositories. A further discussion of data analysis preference derivation is found in FIG. 8.

Figure 2:
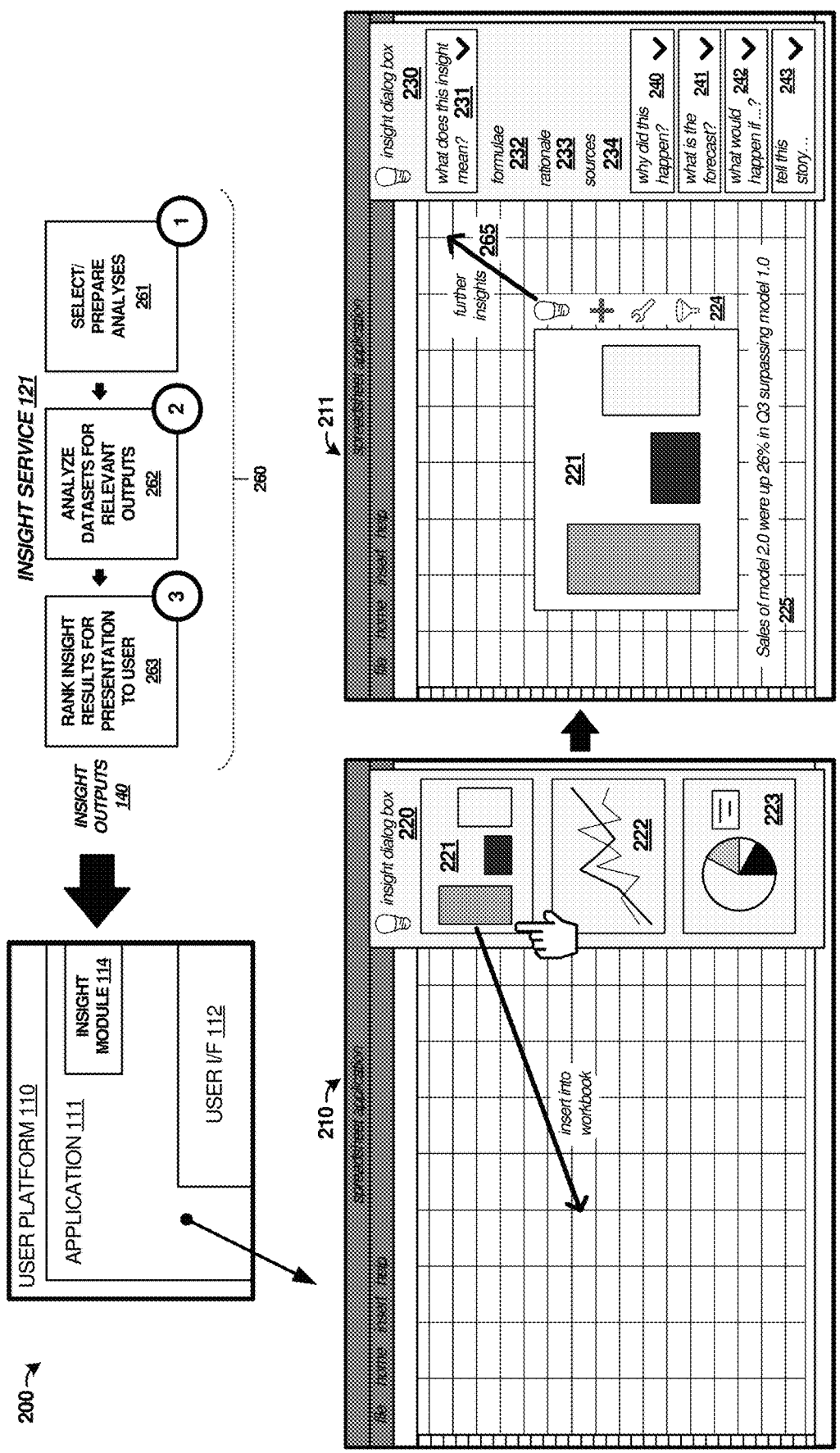
FIG. 2 illustrates operations of data insight environments in an example.

Turning now to an exemplary usage of the insight services, FIG. 2 is presented. FIG. 2 illustrates operations 200 of data visualization environments in an example. FIG. 2 includes user platform 110 from FIG. 1 as applied to insight processes 210 and 211. It should be understood that other user platforms and insight platforms can be employed other than those elements of FIG. 1.

In FIG. 2, a spreadsheet application is presented in process 210. This spreadsheet application can include various user interface elements presented by user interface 112, such as windowed dialog boxes, a user canvas from which data can be entered and manipulated, as well as various menus, icons, control elements, and status informational elements. Furthermore, insight module 114 provides for enhanced user interface elements, namely insight dialog box 220 that include candidate insight objects 221-223. These insight objects can be generated responsive to a user selecting an insight trigger icon or entering an insight analysis command Although FIG. 2 shows these insight objects already generated, it should be understood that various time delays might be required to process associated target datasets to establish the insight objects. Furthermore, background services might monitor user data or target data sets and can establish pre-compute insights for presentation to a user.

Typically, a user will have a set of data entered into the spreadsheet presented by application 111. This data can comprise one or more structured tables of data, as well as unstructured data, and can be entered by a user or imported from other data sources into the spreadsheet. A user might want to perform data analysis on this target data, and can select among various data analysis options presented by user interface 112. However, typical options presented for data analysis by user interface 112 and the associated application 111 might only include static graphs or might only include content that the user has manually entered. This manual content can include graph titles, graph axes, graph scaling, colors, or other graphical and textual content or formatting.

Insight module 114 interfaces with insight platform 120 of FIG. 1 to provide enhanced data analysis and visualization features to a user of application 111. Insight outputs 140 are provided by insight platform 120 for use by insight module 114. Insight module 114 can provide for further personalization of the data and data analysis, among other enhancements. Insights can be generated that are tailored to the data styles, usage modalities, and particular data 'languages' used by a user or organization.

In FIG. 2, process 260 illustrates example insight generation operations which might occur in insight service 121. In operation 261, analysis processes that are to be performed are selected based in part on insight 'knowledge' established for the insight service. This insight knowledge can be based on data analysis preferences derived by processing past usage activities, activity signals, or usage modalities that are found in data files, data storage locations, messaging information, or other data sources. Once a selection of analysis processes is established, then currently relevant user data, such as a target dataset, can be analyzed using the selected analysis processes in operation 262. The target dataset can be processed according to various formulae, equations, functions, and the like to determine patterns, outliers, majorities/minorities, segmentations, or other properties of the target dataset that can be used to visualizes the data or present conclusions related to the target dataset. Many different analysis processes can be performed in parallel and prior to a user triggering an insight presentation process, such as in predictive background processing techniques. In operation 263, insight results are determined and presented to a user by insight module 114 within user application 111. The insight results can be ranked according to relevance to the user, based on insight knowledge, based on insight result confidences, or according to other scoring or statistical relevance selections. A knowledge repository, such as knowledge repository 823 of FIG. 8, might be employed in operation 261.

The insight results can comprise insight objects and associated insight object metadata. In the example in FIG. 2, insights dialog box 220 presents several insight objects 221-223 to a user. These can be presented in a graphical list format, paged format, or other display formats that can include further insights objects available via scrolling user interface operations or paged user interface operations. A user can select a desired insight object, such as graph object 221 and verbiage 225, for insertion into a spreadsheet or other document. Once inserted, then further options can be presented to the user, such as dialog elements 224 from which further insights can be selected in operation 265. Each insight object can have automatically determined object types, graph types, data ranges, summary verbiage, supporting verbiage, titles, axes, scaling factors, or color selections, or other features. These features can be determined using the insight knowledge discussed herein, such as based on data analysis preferences derived from usage modalities or activity signals.

The ordering or ranking of each insight object can be established based on a relevance score or relevance level to the user or target dataset. A relevance level might be determined using the aforementioned insight knowledge so that key insights relevant to the user are ranked higher according to an associated score than other insights. The insight knowledge applies data analysis preferences to determine what data analysis activities and insight objects or visualizations are likely to be important to a user or organization. This insight knowledge is synthesized from various data sources and used when the insight objects are generated. Other ranking processes can include determining a size or magnitude of impact of an insight object to the user or for the dataset, such as based on a history of data analysis performed by the user or organization associated with the user. For example, a user might be more interested in certain data insights than others, and selected ones of these insights can be presented higher in a listing than others. Machine learning of past data analysis activities, past insights that are employed, and past rankings compared to past selections by users, among other activities, can be used in the ranking levels or ranking scoring process.

The further insights 265 in operation 211 can include further options for the user-selected insight or that allow for secondary manipulation, such as presented in dialog box 230 in FIG. 2. Operation 211 provides for mechanisms and tools to allow a user to achieve further analysis when more than a first level analysis of data is desired, such as "insights of insights" or meta-insights. These can include various questions that a user can ask about the insight object presently presented to the user, such as questions 231 and 240-243, among other questions including "what happened," "why did this happen," "what is the forecast," "what if . . . " "what's next," "what is the plan," "tell this story," and the like. Moreover, a user can select a target question, such as question 231 and have further details provided to the user.

For example, question 231 "what does this insight mean?" can initiate various details used to generate the insight, such as descriptions of the formulae 232, rationales 233, and data sources 234 used to generate the insight. The formulae can include mathematical or analytic functions used in processing the target datasets to generate final insight objects or intermediate steps thereof. The rationales can include a brief description on why the insight was relevant or chosen for the user, as well as why various formulae, graph types, data ranges, or other properties of the insight object were established. For example, data analysis preferences derived from past data analysis might indicate that bar chart types are preferred for the previous quarter of sales activity, and then a rationale might indicate a brief description on why insight object 221 includes these associated features. Data sources can indicate data ranges (i.e. columns, rows, cells) from an associated target dataset or many datasets.

Predictive insights can be performed on selected insight 221, which might include determining a forecast or predictions based on the current dataset and insight object or insight conclusions. Forecasting questions can be queried by the user, such as in the form of "what if" questions related to changing data points, portions of datasets, graph properties, time properties, or other changes. Also, iterative and feedback-generated forecasting can be established where users can select targets for data conclusions or datasets to meet and examining what data changes would be required to hit the selected targets, such as sales targets or manufacturing targets. These "what if" scenarios can be automatically generated based on the insight knowledge as well, such as when data analysis preferences derived from past data analysis or cyclic indicators in the insight knowledge indicates certain analyses are preferred or suitable. Moreover, the insight object can act as a 'model' with which a user can alter parameters, inputs, and properties to see how outputs are affected and predictions are changed.

The insight objects in operations 210 and 211 in FIG. 2 are considered "first class object" in these examples. First class objects can comprise dynamic objects with a processing lineage and/or analysis summary associated therewith. The processing lineage includes associated definitions, descriptions, analysis lineage, and cross-app properties forming a rich set of insight metadata that travels with the insight object. The processing lineage can also comprise indications of the data transformations, analyses, relative terms, analysis conclusions, data dimensions or metrics, or other properties that travel with the insight objects in the associated metadata. First class objects can provide for enhanced exporting to other documents, such as presentation documents or whitepaper documents. The metadata associated with first class objects maintain a chain of inference among datasets and data analysis used in determining the associated insight objects. For example, the chain of inference can include a storage of intermediate processing steps, decision trees, formulae, reasoning, data sources, and other rationale or history behind the generation and establishment of the insight objects. The metadata can be included in one or more data structures or data files that accompany the insight objects or in which the insight objects are themselves included.

The chain of inference of insight objects can include tables, opinions, summaries, and underlying data sets that can be automatically generated using the insight service during the processes that establish the insight objects. For example, object metadata can capture and store intermediate steps and intermediate results employed to formulate output insight objects. A processing 'flow' can be established based on the actual steps employed by insight services during the processing of the target datasets. These chains of inference can be used to build graphical and textual stories for the insight objects, so that presentations or white papers can be automatically generated for an insight object that details the insight object creation process performed by the insight service.

Insight objects can comprise dynamic insight summaries, verbiage, or data conclusions. These insight summaries can be established for as insight objects that explain a key takeaway or key result of another insight object. For example, operation 211 includes insight summary 225 as related to graph 221 and that indicates "sales of model 2.0 were up 26% in Q3 surpassing model 1.0." This summary and is dynamic and tied to the metadata associated with the insight object, so that when data values or data points change for an insight object, then the summary can responsively change accordingly. Summary 225 and graph 221 can be include in a common insight object with common object metadata, or might instead be handled as separate insight objects, each with associated object metadata. The summaries can include titles, graph axis labels, or other textual descriptions of insight objects. The summaries can also include predictive or prospective statements, such as data forecasts over predetermined timeframes, or other statements that are dynamic and change with the insight object.

Furthermore, when data changes in an underlying dataset, the dynamic nature of the insight object might spawn a completely different type of insight object responsive to the data changes. Associated summaries or predictions can also flow automatically in response to the data changes and insight object changes. Other information can be provided to a user regarding an insight object, such as indications as to why particular insight objects were selected, why particular summaries were included, or other contextual information that provides further insight into the insight object. Indications of the usage modalities or activity signals can also be indicated to users which indicate the reasoning or steps that drove selection of the output insight objects and associated summaries or conclusions.

Changes to the datasets, such as updated data, improved forecasts, or new data, can prompt automatic changes to the already-generated insight objects. For example, responsive to identifying a user action related to at least a target dataset, insight service 121 can process the user action, the insight object metadata, and the target dataset to produce at least one different insight object for presentation by the insight interface. The user action might indicate a change to the target dataset or selection of another insight object instead of a current insight object. Insight service 121 can also determine new data analysis conclusion verbiage responsive to the change that that textually summarizes the at least one different data insight object. Insight service 121 can determine data analysis conclusion verbiage for each of the data insight candidates based at least on analyzing the target dataset for data patterns in the target dataset and selecting the data analysis conclusion verbiage to embody the data patterns to the user. Also, the insight interface can present a relevance rationale for each of the data insight candidates that indicates, based at least on the target dataset and the usage modalities, an explanation for inclusion of the data insight candidates in the listing of the data insight candidates presented in the insight interface.

These insight objects thus are dynamic with respect to the data itself, and changes in datasets can be automatically detected and trigger changes in the insight objects beyond mere updating data values in graph representations. For example, overlays of past data can be visualized with new or changed data. Different selections for the type of insight object or avenues within chains of inference can be established due to the changes in the data so that different conclusions/verbiage is delivered to a user. Outliers can be highlighted in the changes with respect to old/existing data. Moreover, entirely new reports or insight objects can be generated based on the changes to the datasets. Thus, instead of conventional graphs based on static data that might merely update a graph data point according to data changes, the dynamic insight objects can have entire chains of inference and object type selection altered when underlying data is changed.

First class objects, such as the insight objects discussed herein, also provide for enhanced portability and cross-platform usage. For example, a user might establish an insight object on a mobile device, such as a smartphone or tablet device, and then desire to work with the insight object on a non-mobile device, such as a desktop computer, laptop computer, or via a web interface presented on one of these non-mobile devices, and vice versa. Moreover, a user might desire to have an intelligible interface presented during times when a small-format screen is available. Spreadsheets, among other documents, can be difficult to read and almost impossible to understand on mobile devices with small screen form-factors, such as smartphones and tablet computing devices. Advantageously, by providing a combination of an automated table of contents for spreadsheets together with an automated insight views of tables of data, a primary user interface for a spreadsheet on mobile can be made visual, understandable, and highly interactive—even when those insights and visualizations do not exist in the original spreadsheet. These insights help users to make sense of their spreadsheets and data despite the small form factor screen.

Figure 3:
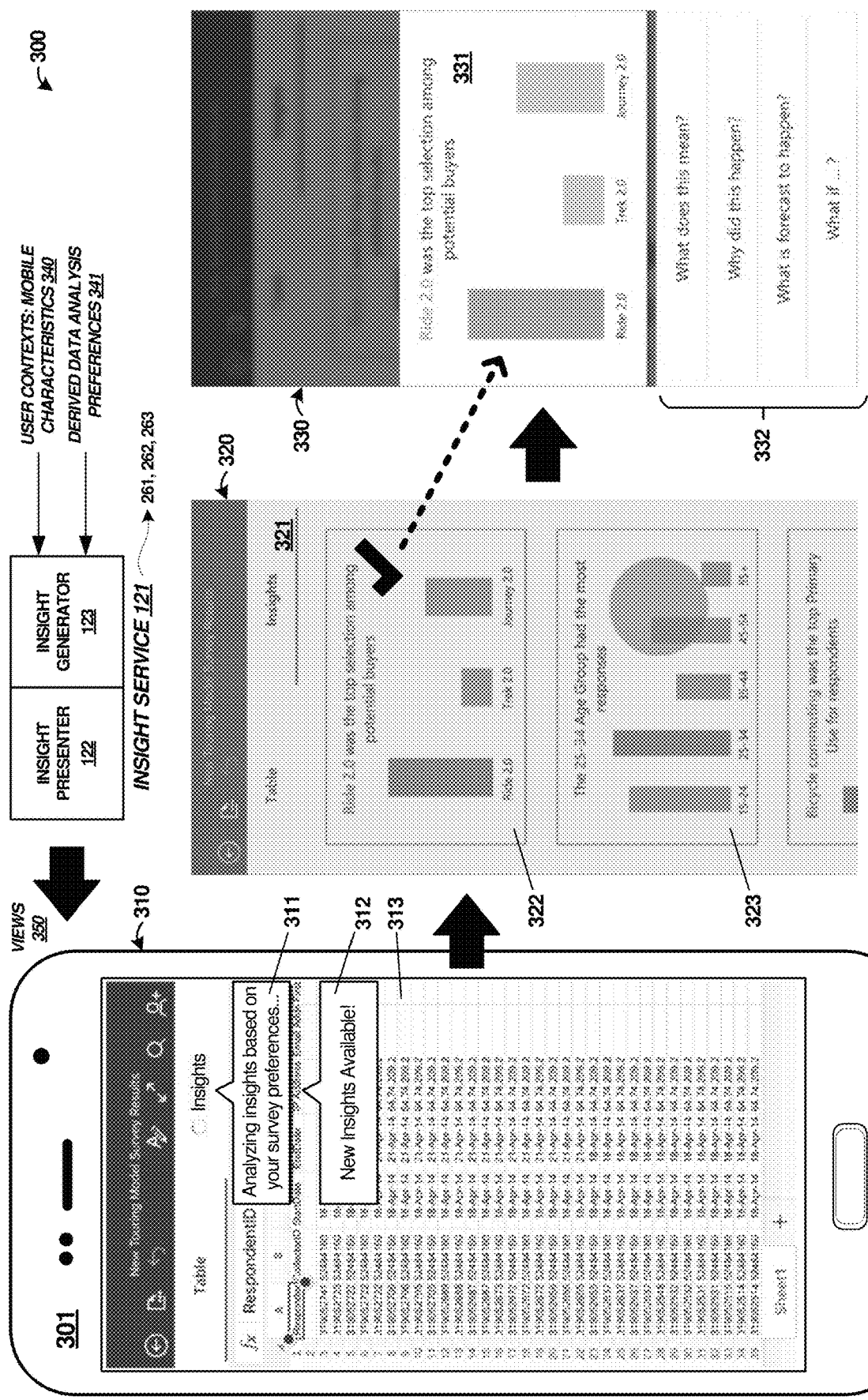
FIG. 3 illustrates operations of data insight environments in an example.

As a first example of data insight mobility using insight objects, FIG. 3 is presented. FIG. 3 illustrates operations of data visualization environment 300 in an example. In operation 310, user interface 313 is presented on mobile computing device 301 as a mobile interface to a spreadsheet, such as on a smartphone or tablet device with a touchscreen user interface. User interface 313 presents a spreadsheet application which has a large amount of data fields that can be difficult to effectively view and analyze on a small form-factor screen as is shown for device 301. User interface 313 also includes insight interface 311 that can be selected by a user to trigger processing of the dataset included in the spreadsheet. This processing includes insight processing, such as by insight generator 123 and insight presenter 122 of insight service 121. Insight service 121 can comprise operations similar to operations 261, 262, 263 of FIG. 2, although variations are possible. Insights can be indicated as available for viewing or presentation to a user in element 312 after an insight process has completed.

As seen in operation 320, an insight view 321 is presented to a user via the mobile device (omitted for clarity). This insight view includes several candidate insight objects that can be scrolled, swiped, or paged through by a user. For example, insight object 322 includes a bar graph with associated labels and summary title related to sales figures. Insight object 323 includes a bar graph with further data analysis on different aspects of the dataset related to age group. A third insight object is presented, but is partially off-screen and can be scrolled or paged to by a user using a touchscreen manipulation.

A user can select one of the insight objects, such as object 322, for further viewing and analysis. Insight object 322 is presented in operation 330 in a focused view of the insight object. Further insights, or "insights of insights" can be presented as well, such as indicated in portion 332. These further insights can include predetermined questions for a user to select and further investigate the dataset via other analysis tools. These insight objects can serve to make it easier for users to digest information on mobile devices.

The mobile insight objects presented to users can be selected according to various user context information and derived data analysis preferences, in addition to the target datasets and insight knowledge elements. These are indicated in FIG. 3 as mobile characteristics 340 and preferences 341. Different devices, such as smartphones, tablet computers, and other mobile computing devices, can have varying screen sizes and resolutions as well as varied communication and processing capabilities. The screen sizes are typically smaller due to the small form factor nature of the devices, such as 5 inches or so in smartphone devices and 8 or 10 inches in tablet form factors, among others. Typically, desktop or laptop computing devices will have larger screens and resolutions which make presentation of spreadsheets or other data presentation formats easier for users to view and analyze. Communication capabilities can vary based on location, wireless coverage areas, communication protocols and signal strength, present bandwidth, or other factors. Processors employed in mobile devices are typically of a lower performance variety than non-mobile devices, and are optimized for power consumption versus performance in typical situations. Thus, mobile characteristics 340 can be considered by insight generator 123 and insight presenter 122 when developing the various insight objects for mobile devices.

In one example, responsive to a user selection on a mobile device indicating an insight object among the one or more candidate insight objects, insight service can associate the selected insight object with the target dataset for subsequent use on another computing device, such as a non-mobile device. The selected insight object can include an associated graphical visualization portion and an associated processing lineage used to produce the associated graphical visualization portion. Insight presenter 122 can present the one or more insight objects in the insight interface to a data analysis application on the mobile device by at least providing for a paged or list view on the mobile device in which a user can swipe through each of the one or more insight object and select an insight object from among the candidates by tapping on a touchscreen portion of the mobile computing device.

Distributed computing and storage systems, such as 'cloud' computing and cloud storage systems, can be leveraged for insight services and insight data storage and processing. By using the cloud systems to process a large amount of information to augment the user/client capabilities, insight service 121 can reduce this complexity deployed in the mobile device, and deliver to the mobile device a higher level of information but still have views generated that are appropriate to current mobile client capabilities. Insight service 121 can consider user contexts such as mobile characteristics 340 which can be transferred to insight service 121 or stored in associated with a user of insight service 121. The considerations include the different properties of a mobile device versus a non-mobile device, including screen size, resolution, number of screens, form factor, battery usage, processing capabilities, communication link capabilities/bandwidth, mobility capabilities, and video output capabilities, among other properties, including combinations thereof.

One further example operation includes where a user identifies a data set for analysis, such as by receiving a data file in an email as an attachment or via a distributed file sharing and storage service. This file might include a target dataset which can be opened for viewing by a user of the mobile device. However, processing and rendering of the insight objects can be handled in a different manner for mobile devices, so that the insight processes discussed herein can handle a large amount of data and create an interaction model that adapts to the proper client device capabilities. Interaction models and modes can be employed that are adapted for mobile clients to consume and make sense of this large amount of data effectively.

Insight service 121 can initiate insight processing on the data sets stored off-device, such as in the cloud or in a distributed storage or messaging system. Insight presenter 122 can present the mobile device or platform with one or more mobile-appropriate insight views 350 that comprise insight objects based on the target dataset, knowledge/data analysis preferences, and the mobile characteristics. In this manner, an interaction mode appropriate for mobile device, such as menus or user interface elements more suitable for mobile device, modalities of summaries, data/insight explorations tailored to device properties can be established for a user to interface with the presented insight visualizations. For example, instead of pull-down menu or ribbon driven insight menus or properties, insight operations more suitable to mobile touchscreens can be employed, such as finger/stylus scrolling, page flipping, or other mobile user interactions.

Moreover, insight service 121 might not transfer the entire data or metadata associated with insight objects to the mobile devices to avoid large transfers over wireless or bandwidth-limited interfaces. Insight presenter 122 can render insight objects remotely in insight service 121 and transfer static image renderings or 'clickable' renderings that can be explored by users or leveraged to create further insights on a mobile device. This selective rendering can have a spectrum of rendering, so that a selected portion of an insight object might reside in a distributed storage service while only a portion of an insight object, such as a graphical image, might be transferred to the mobile device. Insight presenter 122 can intelligently select what elements to render locally or remotely, what elements to omit for a simpler or more complex presentation, and other features based in part on the mobile device characteristics. When a user selects a particular insight object, then further data can be transferred to the mobile device, or further insights can be performed remoted from the mobile device for later transfer as fully-rendered objects. In further examples, only summaries or headlines of the various data insight candidates are transferred to the mobile device, and only responsive to user interaction are insight objects rendered for transfer to the mobile device.

Although various views 350 that comprise thin or image-only renderings of insight objects or insight candidates can be transferred to the mobile device, insight service 121 maintains insight object metadata in association with the views 350. Thus, the views might only comprise a thin rendered version of the insight object and not include any dynamic content, interactive content, or associated metadata. Instead, the metadata indicating at least the processing lineage is maintained remotely form the mobile device by insight service 121. Insight object metadata might be withheld from transfer to the mobile device to conserve wireless bandwidth. However, the insight object metadata can be stored in a distributed or remote storage system remote from the mobile device for later use. For example, the metadata might be used to interact with the associated insight object on a desktop device or non-mobile device. The insight object maintains the rich 'first class' processing lineage even though a mobile device might only be presented with a thin rendering or static image that represents the insight object, while the metadata is stored remotely from the mobile device. Alterations to the data or target datasets on the mobile device can be communicated to insight service 121 and responsively insight service 121 can use the processing lineage indicated by the metadata to alter or create insight objects commensurate with the alterations to the data. Further static images or associated renderings/views can be transferred to the mobile device, and processing of the metadata and processing lineage can be prevented from occurring on the mobile device.

Figure 4:
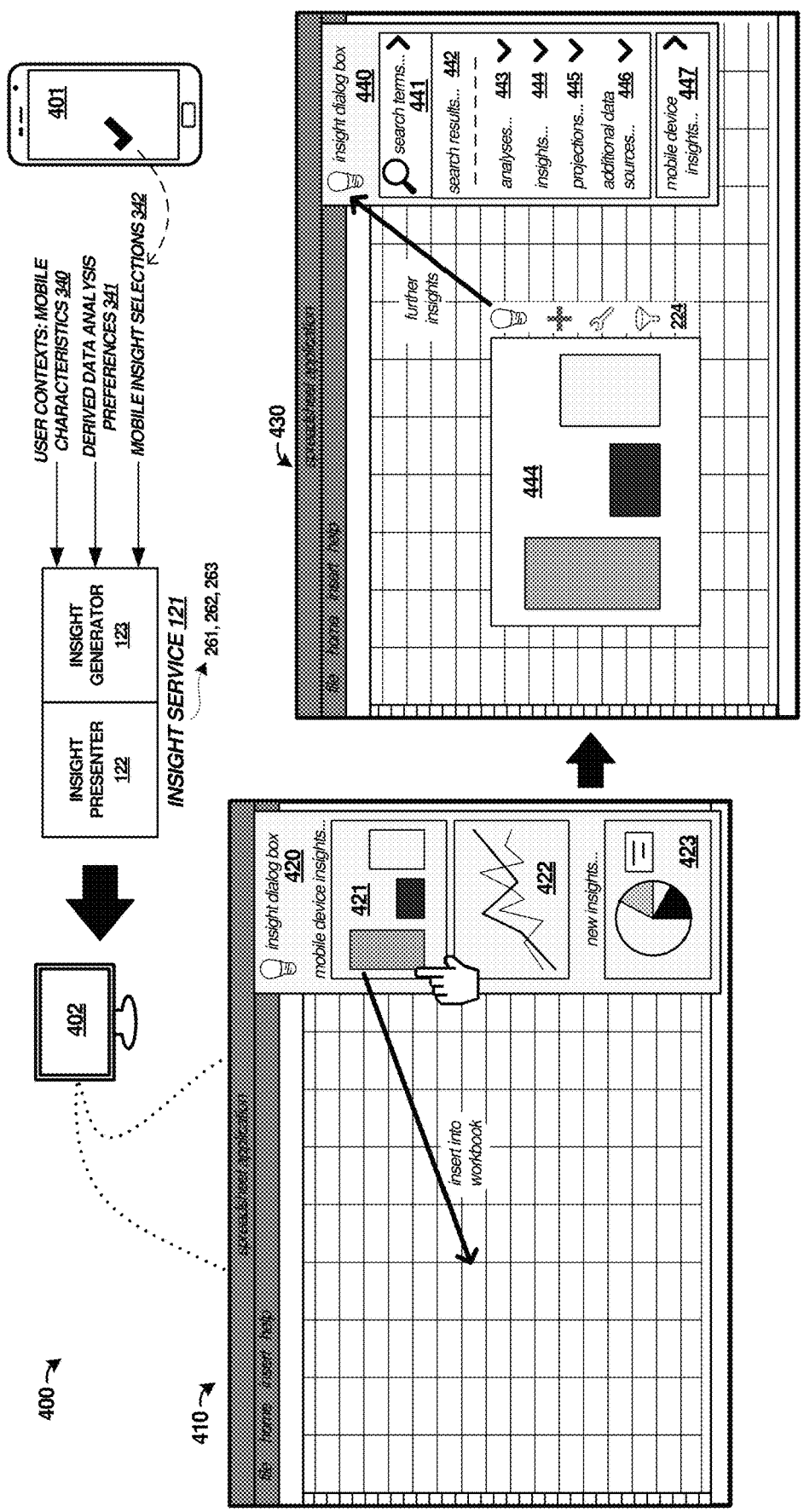
FIG. 4 illustrates operations of data insight environments in an example.

FIG. 4 illustrates operations of data visualization environment 400 in an example. FIG. 4 illustrates portability of these insight objects and associated metadata between mobile and non-mobile devices. For example, mobile device 401 might comprise a touchscreen-based smartphone with a small form-factor screen in the range of less than 7 inches diagonally, whereas desktop computer 402 comprises a personal computer with one or more large form-factor displays in the range of 7 or more inches diagonally. Sizes of the screens can vary, and the mobile and non-mobile designations might instead be based on an operating system type or operating system user interface presentation mode. For example, a watch, smartphone, or tablet computing device might be considered a small form-factor device, whereas a laptop, notebook, or desktop computing device might be considered a large-form-factor device.

User context information, such as mobile characteristics 340, can be considered in creation of the various insight objects as discussed above, as well as derived data analysis preferences 341. When a user selects one or more insight objects on the mobile device, these insight objects can be stored (along with associated object metadata) for later use and manipulation on a non-mobile device. Mobile insight selections 342 can be indicated to insight service 121 that communicates one or more selected insight objects. Mobile insight selections 342 might indicate 'pinned' or mobile-selected insights that can be later indicated for use on a non-mobile device.

Once a user employs a non-mobile or larger form-factor device, the selected insight objects can be presented to the user with associated metadata included therewith. The "first class" object nature of the insight objects allows for the processing lineage to follow the insight objects, and can include a processing history, chain of inference, and other properties of the insight objects to travel with the insight objects. Further data manipulation, insight processing, and projection activities can be performed on the non-mobile device from activities originally rooted in a mobile device interface. Advantageously, a user can move from a mobile device to another device seamlessly using the insight objects and associated metadata. A more detailed view and analysis might be available on the non-mobile device or larger form-factor than on the mobile device due in part to a possibly larger available screen real-estate available and processing power of the non-mobile device.

For example, a user might be presented with insight objects 420 in operation 410. These insight objects 421-423 might have originated during use of mobile device 401. When a user migrated to using a non-mobile device, such as desktop computer 402, these insights are automatically presented in insight dialog box 420, such as indicated for mobile device insights 421 and 422. Further insights and data analysis can be performed in operation 430, such as shown for new insights 443.

In operation 420, a user can search 441 using keywords or other search terms among various insights that have been previously generated, arise from previous mobile insight activities, or arise from additional analysis. Search results 442 can include analyses 442, insights 443, projections 444, and additional data sources 445, among other results. Furthermore, insights previously generated and/or selected on a mobile device or mobile interface can be indicated and listed using element 447.

Figure 5:
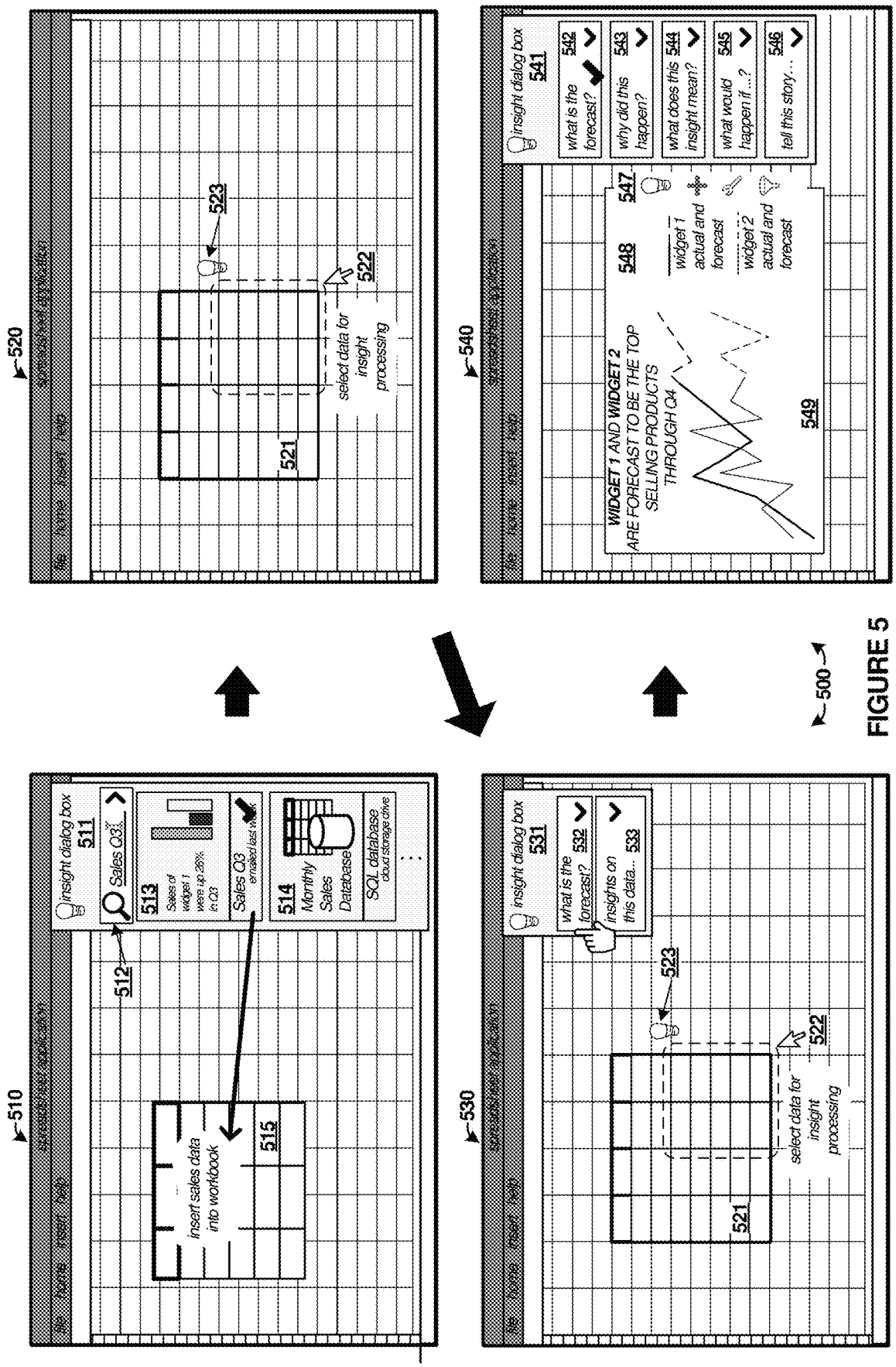
FIG. 5 illustrates operations of data insight environments in an example.

FIG. 5 illustrates operations of data visualization environment 500 in an example. FIG. 5 considers operations related to user searching among various data sources for datasets to include in insight analysis operations, as well as example projections based on these datasets. In operation 510, a user can enter one or more search terms for discovering dataset sources among various data storage systems, such as messaging systems, distributed data storage systems, local storage systems, and others. Insight dialog box 511 indicates search box 512 with example search terms "sales Q3" entered by a user. Results can be returned in dialog box 511 below the search box and can be sourced from various data sources as indicated previously. The results can indicate raw/unprocessed datasets, or can include insight objects previously determined for the present user or for other users to which the present user has visibility.

A user might have datasets, data objects, data visualizations, or other data-related items contained in data files or other data sources, and a user can search among these. Insight objects can also be searched among and search results can return various insight objects related to keywords entered by the user. For example, a current user or other user might have established an insight analysis for Q3 sales results, as indicated by insight object 513. A user might select this insight for further analysis, and this insight object or the associated dataset can be inserted into the user interface portion or user canvas portion of the spreadsheet. If a dataset is selected, such as in operation 520, then associated fields of a worksheet can include the data after insertion. If an insight object is selected for insertion, then the insight object can be included in the worksheet along with any associated metadata indicating processing lineage information for that insight object.

In operation 520, a dataset 521 has been inserted into an associated worksheet, and data values, headings, and other information for the dataset can be included. A user can select a range of cells or data fields associated with the dataset to perform insight processing upon. Selection 522 indicates this selection of a subset of the fields of the inserted dataset. A user can select an insight initiation element 523 to instruct an associated insight platform or insight service to perform insight processing on the selected data. Operation 530 indicates one possible insight dialog box 531 that might result from a user selecting insight initiation element 523. Insight dialog box 531 indicates various options for insight processing of the data selected in selection 522. Although further options can be presented, in this example a forecast option 532 and a general insight processing option 533 are presented for the user to select.

In operation 530, a user selects "what is the forecast" 532 and a forecasted insight object is presented to the user in operation 540. The forecasted insight object 549 can employ data associated with the insight object or data originally selected (e.g. 522) to determine one or more projections or predictions. Insight knowledge information can be employed for the predictions, such as cyclic information, seasonality information, or other trends determined for the datasets and from past insight analyses or other datasets. Forecast 549 includes a summary statement 548 about "widget 1" and "widget 2" based on the existing sales data and projected sales data taking into account cyclic trends in past data. This projection can be automatically generated by an insight service without a user having to specify cyclic indicators or seasonality information, as this information can be gleaned by insight generator during the knowledge generation process discussed herein. Trends or seasonality for the target datasets can be determined based at least on cyclic activity indicators derived from distributed user data storage services, distributed network messaging services, or distributed application data storage services associated with one or more users of the user application, such as discussed herein for operational knowledge determination or usage modality determination.

Further insights 547 can be established as well. Further insight analysis, such as indicated in operation 540 can include further projection analysis or other insight options indicated in dialog box 541. These example operations include insights 542-546.

Figure 6:
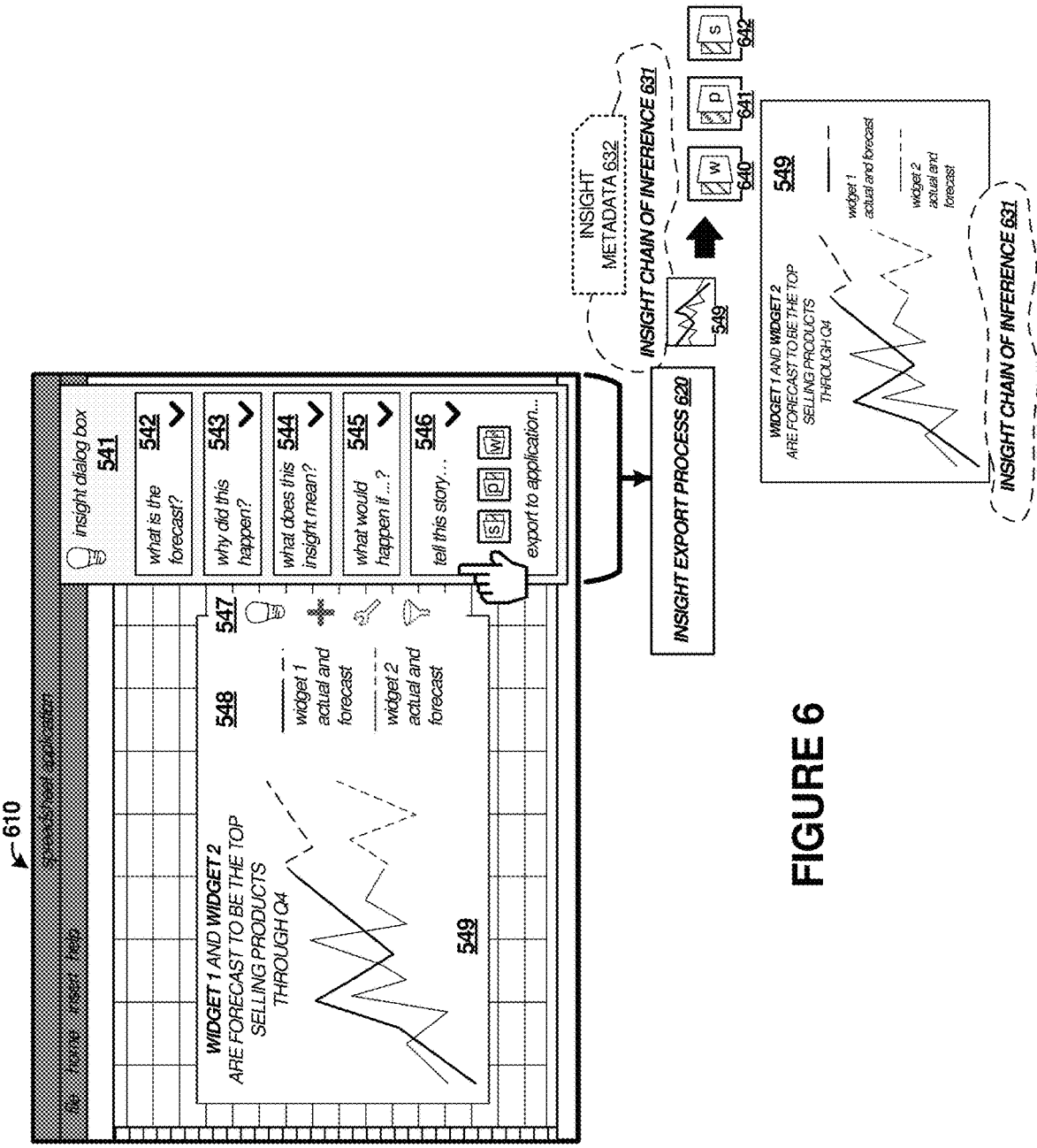
FIG. 6 illustrates operations of data insight environments in an example.

In addition to working within the spreadsheet application or other application native to the dataset and insight object analysis, further applications can be employed. These further applications can be used for further data analysis, but also for telling a story or narrative about the data and associated analysis. FIG. 6 illustrates operation 610 using elements shown in FIG. 5, and can be provided by portions of insight service 121. Insight export process 620 can be selected by a user in FIG. 6 using action 546 indicating "tell this story."

Various other linked or associated applications 640-642 can be employed to display the insight objects and associated chains of inference 631. Chains of inference 631 can include the insight metadata 632 that can indicate a processing lineage used to form the associated insight object. For example, a presentation application 641 might be desired to show the data processing lineage used by insight service 121 for establishing the insight objects or insight summaries/ conclusions. Presentation slides can be generated by insight export process 620 based on the processing lineage indicated in insight chain of inference 631. Intermediate steps of data process, analysis, and calculation can be included in individual slides of the presentation and be generated to tell a story of the underlying data, forecast, insight, or other information. Verbiage, such as summary information, titles, labels, and the like can also be included.

Insight export process 620 maintains the metadata associated with insight object 549 as being linked to the insight object, thus the insight objects remain dynamic and responsive to data changes or insight analysis changes. Moreover, a processing lineage established for the insight objects indicates a flow of calculation, decision-making, object selection, data analysis, or other activities employed by insight service 121 to generate the selected insight object. The processing lineage includes various 'story' information for the insight objects and associated metadata, and indicates a history of the dataset processing through intermediate steps, formulae, reasoning, and other analysis choices. The datasets, insight knowledge, derived data analysis preferences, usage modalities, or activity signals that drove the particular insight analysis can be indicated or can drive the processing lineage contents. The export process in this example establishes a presentation, white paper, or other long-form description of the process used by insight service 121 in generating the insight objects, all presented in a user-friendly format ready for viewing.

Figure 7:
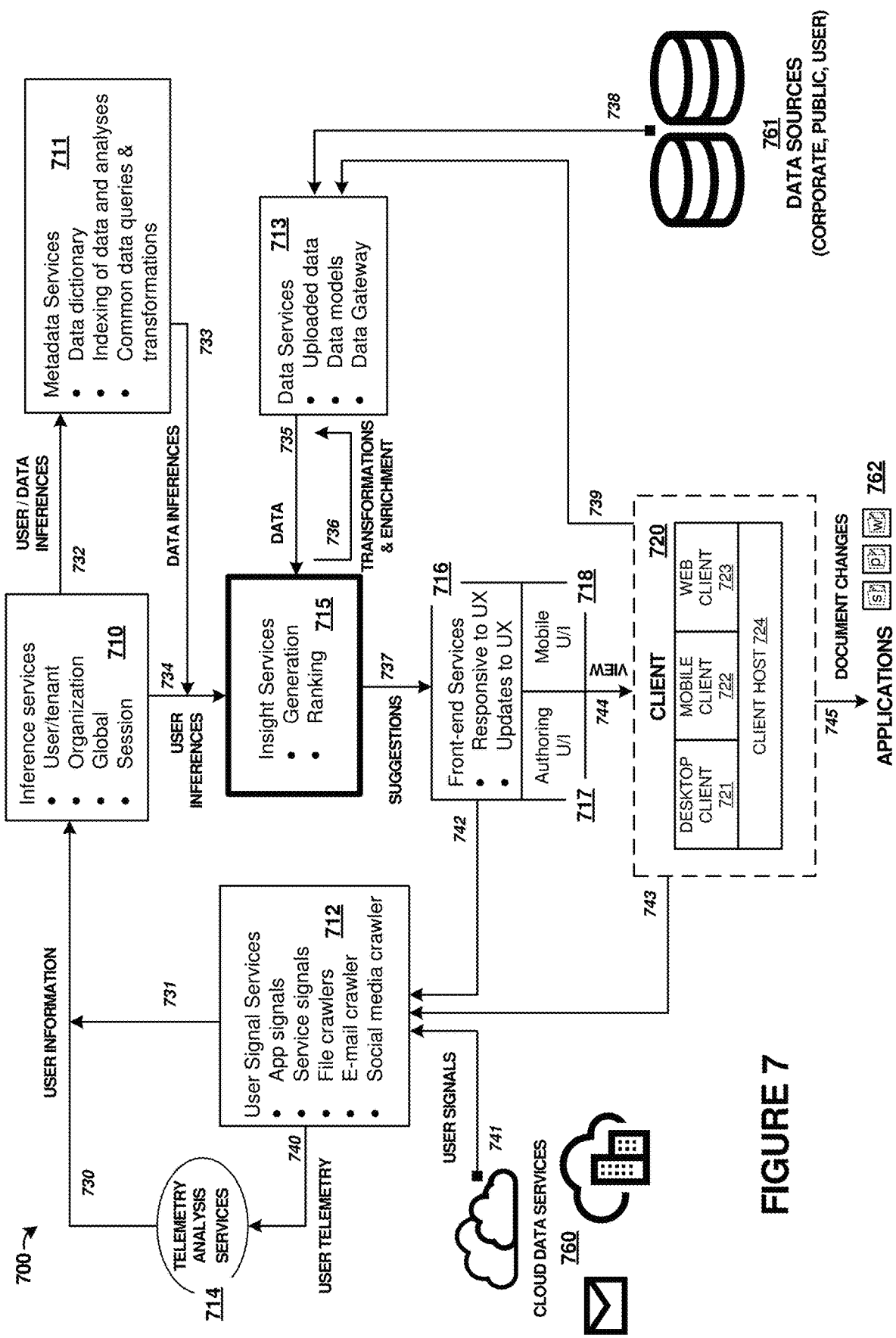
FIG. 7 illustrates a data insight environment in an example.

FIG. 7 illustrates data visualization environment 700 in an example, and presents a detailed example system view of one example data visualization environment. Elements of data visualization environment 700 can be used to implement any of the insight services, client devices, and knowledge generation and storage services discussed herein.

Environment 700 includes inference services 710, metadata services 711, user signal services 712, data services 713, telemetry analysis services 714, insight services 715, front-end services 716, client 720, cloud data services 760, data sources 761, and applications 762. Communication links 730-745 comprise one or more logical or physical communication links for carrying data and other traffic among the associated elements in FIG. 7. For example, links 730-745 might comprise memory-mapped links, network links, wireless links, wired links, application programming interfaces (APIs), or other links, including combinations thereof. Each link can comprise more than one communication pathway or multiple links in some examples.

In FIG. 7, user signal services 712 are employed to determine application signals and service signals for users based on data stored in cloud data services 760. These cloud data services can include email/messaging systems, organizational data storage services, cloud/distributed storage systems, social media systems, or other data sources. User signal services 712 comprises one or more 'crawlers' that can extract activity signals from the various data sources. These activity signals can indicate personal knowledge, organizational knowledge, or global knowledge that can be employed in generating insight objects at later times. User signal service 712 can take as inputs various user signals from cloud data services 700 over link 741, various client activity/feedback from client 720 over link 743, various front-end insight activity from front-end services 716 over link 724. User signal service 712 can output user telemetry determined from the various crawlers to telemetry analysis services 714 over link 740 for further extraction/determination of activity signals from user telemetry. The user telemetry and activity signals can be provided as user information over links 730 and 731 to inference services 710. User telemetry can include actions or usage patterns monitored for applications employed by the user and determined from among data crawled in cloud data services 760. Activity signals can include preferred data presentation objects, methods, or analyses, among other activities that are indicated within and by the files or data crawled among cloud data services 760.

Inference services 710 can employ the user information comprising activity signals determined by element 712 and the application telemetry determined by element 714 to infer various levels of "knowledge" or data analysis preferences comprising data hierarchies and preferred insight analysis processes among users, tenants/clients, organizations/domains/companies, globally across entire applications, for particular sessions, or other distinctions. These inferences can include inferences about the user activities and the user data from previous data analyses and current data analyses. In one example, metadata services 711 can catalog and organize the user/data inferences received over link 723 into a data dictionary for indexing of the data and analyses of common data queries, transformations, and other inferences from user information. User and data inferences comprising data analysis preferences can then be provided to insight services 715 over links 733/734 for determining insight objects and metadata for current target datasets.

Once a user indicates a current set of data or target dataset for analysis, then insight services 715 can employ these data analysis preferences to establish the insight objects/metadata by generating insight objects according to the data analysis preferences. Ranking among many insight objects generated can be handled by insight services 715. Previews for visualizations of the insight objects can be generated for delivery to front-end services 716. Furthermore, insight objects, suggestions, recommendations, and associated metadata can be provided over link 737 to front-end services 716. The current sets of data or target datasets can be identified by data services 713 and transferred over link 735 to insight services 715. The target data can include uploaded data, user-entered data, cloud-stored data, data models, or from various data sources 761. Data sources 761 can include various user data storage elements comprising local, distributed, corporate, organizational, or public data sources, among others. Insight services 715 can store processed data, insight objects, and insight object metadata for later usage and referencing in data services 713 over link 736.

Front-end services 716 provide for user interface activities and application interface activities. These activities can be used as feedback signals for further refinement and consideration by user signal services 712. Front-end services 716 provide for actions responsive to user experience (UX) activities and updates received within the user interfaces presented within the applications. Front-end services 716 can provide for various portable interfaces based on a form-factor of an end user device presently employed. For example, an authoring user interface 717 can be determined for large form-factor devices, including desktop computers and laptop computers. A mobile user interface 718 can be determined for small form-factor devices, including mobile devices, smartphones, and tablet computing devices. Various views can be sent for presentation by client 720 over link 744.

Client 720 can comprise one or more end user devices, which might include desktop clients 721, mobile clients 722, or web-based clients 723, among other clients. These clients can be executed by client host 724 for presentation of one or more applications 762. Document changes, including data entry/changes, or insight visualizations can be provided to users over user interface elements and insight elements 745.

As users interact via applications and associated user interfaces or insight interfaces, feedback mechanisms are employed to further refine and enrich the insight generation experience as well as further determine activity signals or application telemetry for later insight object generation.

Figure 8:
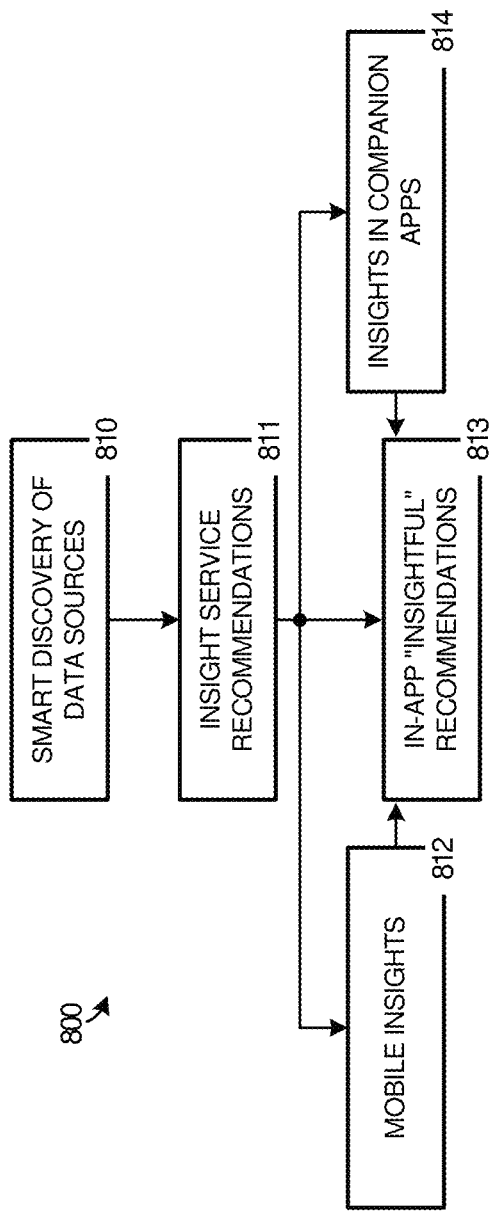
FIG. 8 illustrates operations of data insight environments in an example.

FIG. 8 illustrates operations 800 of data visualization environments in an example. The elements of environment 700 are discussed as related to the operations in FIG. 8. However, it should be understood that other elements, environments, and systems can be employed. In FIG. 8, environment 700 provides for smart discovery of data sources (810). This smart discovery can include discovery of existing user data, organizational data, application data, or other data, such as found in cloud data services 760 or data sources 761, among other sources. User activity signals and user telemetry can be processed to determine usage modalities from which data analysis preferences can be derived, and other information from which insights can be based. New user data for insight analysis can be discovered by manual entry of data in an application or from user data sources.

Insight objects, such as charts, graphs, or other objects, can be recommended (811) based on the insight processing that considers data analysis preferences derived from activity signals and usage modalities, along with target datasets identified for analysis. These service-backed recommendations can then be further used to determine mobile insights (812) for small form-factor devices, determining insight objects for companion applications or exported insight objects that maintain/retain metadata and chains of inference (814), and for in-application insightful recommendations (813) from which users can perform further data analyses and projections.

Figure 9:
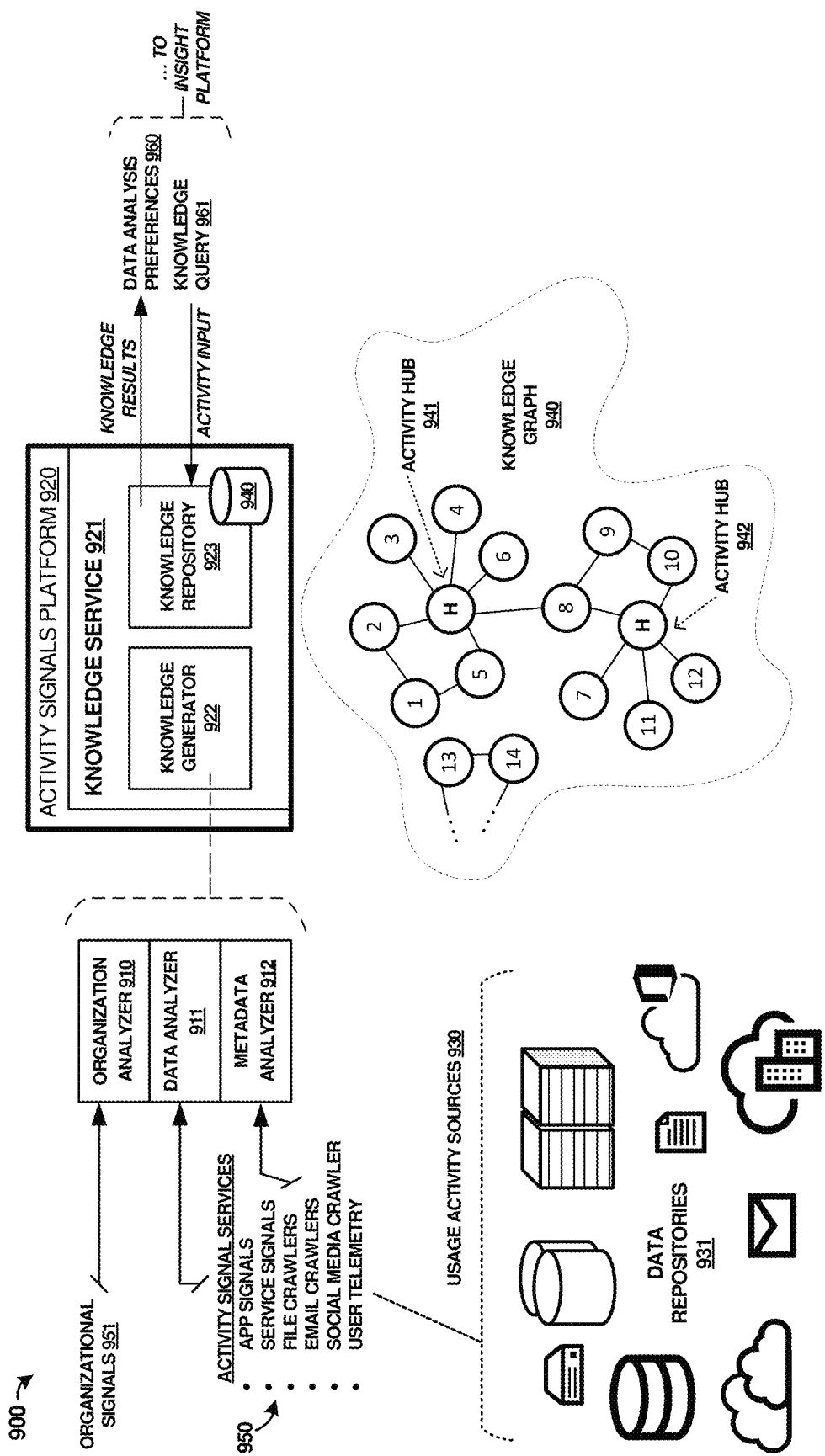
FIG. 9 illustrates an operational knowledge environment in an example.

The various examples herein employ operational "knowledge" comprising data analysis preferences derived or inferred from activity signals, usage modalities, past data analysis activities, or other information from which insights can be derived or inferred for target datasets. Inferring the data analysis preferences from among the application usage activity can be based on a frequency ranking of activity signals or usage modalities for one or more users or within an organization. To illustrate one example knowledge generation architecture, FIG. 9 is presented. FIG. 9 illustrates operational knowledge environment 900 in an example which can be employed for operational knowledge discovery and generation for use in the various insight processing examples herein.

An example process for usage of the elements of FIG. 9 can include (1) determination of operational knowledge based in part on past/existing dataset analyses, application telemetry, activity signals, organizational preferences, or other information related to previous dataset analyses; and (2) application of this operational knowledge from a data dictionary or knowledge repository to newly identified target datasets to automatically generate a plurality of relevant insight objects, insight conclusions, or insight metadata.

In FIG. 9, knowledge graph 940 is determined using various user activity signals determined for users, applications, services, organizations, and other user signal sources. Organizational signals 951 include metrics and data related to how an organization typically uses data, what data insight objects are preferred or employed often, and what analysis has been performed in the past for various users and members of an organization. User signals can be derived using signal services 950. Services 950 include various crawlers and telemetry determination systems that extract relevant activity or information related to usage modalities and application usage from various data sources including files, email, messages, social media, and other sources.

For example, usage activity sources 930 can be crawled by various crawler services to find files, metadata, previous analyses, previous datasets, user communications, user preferences, or other information from among the various data repositories 931. Data repositories 931 can include local or remote data sources, which can be distributed or cloud-based data storage services and systems, email or messaging systems, and other data systems. These crawlers process multiple data sources, documents/files from within cloud-based or local storage, as well as email systems, to identify properties, attributes, data analysis choices of users and organizations. This is processed to determine activity signals or usage modalities that are then used to derive data analysis preferences or "knowledge" based on inferences on user activity and user preferences employed on past data analysis to apply to future data analysis. Feature extraction can be performed on the information gleaned by modules 910-912 to determine 'root' actions or activity signals and generalize the activity signals for use in knowledge graphic processes. Removal or stripping of personal/user information might be performed to enhance privacy or anonymize the activity signals from the actual data, datasets, or user/organizational identities in some examples.

Organization analyzer 910, data analyzer 911, and metadata analyzer 912 provide for extraction and determination of relevant user activities, previous analyses, usage modalities, and user activity signals which can be employed by knowledge generator 922 of knowledge service 921. Knowledge service 921 is provided by activity signals platform 920 which includes knowledge generator 922 and knowledge repository 923.

In a further operational example, data repositories 931 and other usage activity sources 930 can be identified as data sources that relate to application usage activity of one or more users. Knowledge service 921 employs elements of knowledge generator 922 to determine various activity signals related to at least data analysis by the one or more users from among the application usage activity. Activity signals that include information provided by user activity signal services 950 and organizational signals 951 can be determined using associated ones of modules 910, 911, and 912 that analyze, crawl, and otherwise process data, files, activity logs, telemetry, email, social media data, or other signals and information to determine application usage activity for users and organizations associated with those users. For example, data analyzer 911 can process datasets, data files, and content of various data sources and data files to determine activity signals for use by knowledge generator 922. Likewise, metadata analyzer 912 can process metadata and other contextual information related to the data sources to provide further information related to activity signals for use by knowledge generator 922. Organization analyzer 910 can process various activity information for organizations, such as organizational policies and related data, organizational profiles, security properties, usage rights information, among other information.

Knowledge generator 922 of knowledge service 921 applies the activity signals to infers data analysis preferences from among the activity signals. Knowledge graph 940 is one example knowledge graphing output based on activity signals determined from the various data sources. Knowledge service 921 provides portions of the data analysis preferences for use by data insight services that establish data insight objects visualizing and describing target datasets based at least on the ones of the data analysis preferences. Knowledge repository 923 can store the data analysis preferences for later usage in insight processing. Knowledge repository 923 can store the data analysis preferences in accordance with one or more scope categorizations comprising at least one among user scope, organization scope, and application scope.

Knowledge service 921 determines the data analysis preferences and knowledge that is provided for insight processing. Various activities, operations, preferences, or other user/organization information can be analyzed by knowledge generator to determine one or more key activities indicated by activity hubs. A knowledge graph 940 can be employed to map or graph user/organization information to identify clusters of activity nodes or clusters of analysis types, among other information. For example, activity hubs 941-941 can represent a nexus among many activity nodes 1-14 representing activity operations performed by a user or by users within an organization. Activity hubs 941-941 can be identified by a connectivity score indicating a threshold number of edges or connections among nodes of knowledge graph 940. A frequency ranking among activity signals can also be employed to determine activities that are commonly used or commonly employed by users or organizations, and knowledge graph 940 can indicate this frequency ranking via connectivity properties or connectivity scores.

Knowledge graph 940 can be a dynamically-changing entity that is augmented with new usage activity information from among data repositories 941 and associated crawlers as well as from ongoing user activity provided by an insight service or insight platform. A knowledge graphing process is used in FIG. 9 by knowledge generator 922 to determine key activity and action hubs within graph representation 940 of user/organization activities or actions. Key hubs are assigned confidence levels or ranked based on relevance or knowledge confidence levels, and can vary over time. Confidence levels can translate into ranking of insight objects later developed from the knowledge repository by insight services for new target datasets. The hub rankings can also consider recency/temporal considerations, data share importance, number of people/users data or analyses are shared with, a volume of analysis usage, volume of analysis or insight object access, or prominence in documents/reports, among other factors.

Knowledge graph 940 identifies operational knowledge that is relevant to a user or organization. This operational knowledge can be stored in knowledge repository 923 that comprises one or more storage devices. Various graph analysis services or programs can be employed to determine the operational knowledge, such as Microsoft® Graph or other software. Knowledge repository 923 can comprise a data dictionary that memorializes the operational knowledge in the form of activity signals or usage modalities. Knowledge repository 923 is later referenced or searched by insight services to determine the associated insight objects, insight summaries/conclusions, insight projections, and insight object metadata, among other information related to insights.

Data dictionaries, such as provided by knowledge repository 923, allow users to analyze data in "languages" or according to habits that more closely map to how the users typically leverage or discuss associated datasets. Knowledge repository 923 can map terms a user might use to describe data in associated with the items described to the actual data. By leveraging the charts, tables, pivot tables, and formulas that represent previous or past user analysis, along with the spreadsheets, reports, dashboards, presentations, emails, and documents that are the context by which those analyses are shared, knowledge generator 922 can get strong signals on how users map data to actual usage. Knowledge inferences can also include actions taken by users to create documents, or to analyze data, including "who, what, where, when" inferences based on file attributes, document types, document contents, and other document or file properties and content. Machine intelligence and various graph analysis tools can be employed to generate a data dictionary through observations of the user activities or modalities drawn from activity signals.

As outputs from knowledge service 921, data analysis preferences 960 are provided to an insight platform, such as insight platform 120. Indications of activity, datasets, or other information can be employed to query 961 knowledge service 921 from insight platform 120 to retrieve data analysis preferences 960 that are related to or can be applied to current user activity or current insight processing activities. For example, one or more 'knowledge results' can be provided responsive to queries by insight services. Knowledge service 921 can infer data analysis preferences from among the activity signals based at least on a connectivity level identified using knowledge graph 940 for activity nodes representing at least portions of the activity signals. As can be seen in knowledge graph 940, two activity hubs 941-942 can indicate two nexuses of activity signals that can be used to infer preferred ways of presenting, analyzing, or describing datasets. Knowledge service 921 can select ones of the data analysis preferences to provide to the requesting data insight services based at least on graph relationships determined by knowledge graph 940 between the ones of the data analysis preferences and data included with query 961 as issued by the data insight services. The data included with query 961 can indicate current data analysis activity for the one or more users, among other information including user identities, organizational identities, application identities, dataset information, or other information.

In a specific example, during application usage by a user (such as a spreadsheet application), a user might desire to receive one or more data insights for a dataset loaded into the spreadsheet application. An associated insight service, such as insight service 121, can provide various inputs to knowledge repository 923 in query 961. These inputs can be included in knowledge query 961, and comprise user information, user identities, datasets, data sources, application identities and information, and user activity information. Based on this information, knowledge service 921 can select one or more knowledge results that indicate data analysis preferences 960 that are relevant to the query. The data analysis preferences can include graph or object types, field aggregation preferences, column/row/header naming preferences, formatting preferences, or other data analysis preferences. The data analysis preferences can include both calculation or data processing preferences as well as data visualization or description preferences.

Knowledge repository 923 can store the data analysis preferences according to one or more scope properties or categories. For example, data analysis preferences can be stored on a per-user, per-organization, per-tenant, per-application, or a global/general basis. Knowledge query 961 can indicate properties associated with the current insight processing that relate to a user, organization, tenant, application, or other scope, and this scope provided in the query can be used by knowledge repository 932 to return appropriate data analysis preferences commensurate with that scope and associated security permissions, if any. Storage fan-out from root data analysis preferences determined by knowledge generator 922 to associated sub-categories and scopes can also be performed to ensure that each affected scope is correlated with associated inferred data analysis preferences. Knowledge repository 923 can store the data analysis preferences in a table format or a graph format, among other data storage formats.

The activity signals are determined from usage activity sources 930, among other sources, and can indicate how the users perform analysis and which language or traditions the users employ to communicate analyses. Inferences on data analysis preferences and operational knowledge can be determined based on these activity signals and language/traditions, and these inferences can be made available for usage in insight generation. The insight generation can span various users, clients, organizations, or globally across an entire application or platform. Advantageously, users have more efficient data analysis performed on the various datasets, and the analyses can be performed by jump-starting data analysis from existing traditions or tribal knowledge used for past data analyses. The data analysis, synthesis, and visualization processes employed to handle large and complex datasets can be accelerated and made more relevant to users. More efficient usage of processing resources employed for data analysis can be achieved, and analyses targeted to specific device form factors can also be determined.

Figure 10:
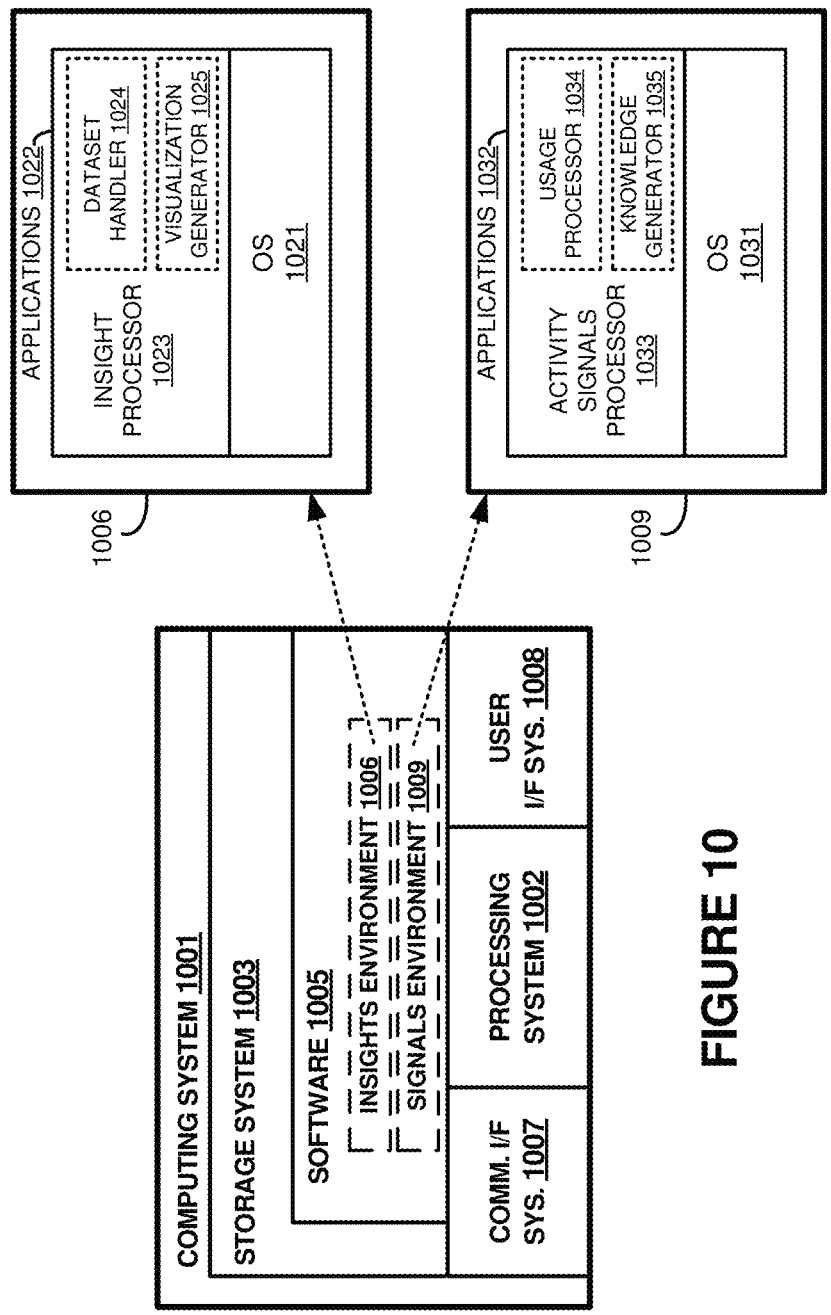
FIG. 10 illustrates a computing system suitable for implementing any of the architectures, processes, and operational scenarios disclosed herein.

Turning now to FIG. 10, computing system 1001 is presented. Computing system 1001 that is representative of any system or collection of systems in which the various operational architectures, scenarios, and processes disclosed herein may be implemented. For example, computing system 1001 can be used to implement any of user platform 110 or insight platform 120 of FIG. 1, or platform 820 of FIG. 8. Examples of computing system 1001 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof. When portions of computing system 1001 are implemented on user devices, example devices include smartphones, laptop computers, tablet computers, desktop computers, gaming systems, entertainment systems, and the like.

Computing system 1001 may be implemented as a single apparatus, system, or device or may be implemented in a distributed manner as multiple apparatuses, systems, or devices. Computing system 1001 includes, but is not limited to, processing system 1002, storage system 1003, software 1005, communication interface system 1007, and user interface system 1008. Processing system 1002 is operatively coupled with storage system 1003, communication interface system 1007, and user interface system 1008.

Processing system 1002 loads and executes software 1005 from storage system 1003. Software 1005 includes insights environment 1006 and/or signals environment 1009, which is representative of the processes discussed with respect to the preceding Figures. When executed by processing system 1002 to enhance data insight visualization and activity knowledge inference, software 1005 directs processing system 1002 to operate as described herein for at least the various processes, operational scenarios, and environments discussed in the foregoing implementations. Computing system 1001 may optionally include additional devices, features, or functionality not discussed for purposes of brevity.

Referring still to FIG. 10, processing system 1002 may comprise a microprocessor and processing circuitry that retrieves and executes software 1005 from storage system 1003. Processing system 1002 may be implemented within a single processing device, but may also be distributed across multiple processing devices or sub-systems that cooperate in executing program instructions. Examples of processing system 1002 include general purpose central processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, resistive memory, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1003 may also include computer readable communication media over which at least some of software 1005 may be communicated internally or externally. Storage system 1003 may be implemented as a single storage device, but may also be implemented across multiple storage devices or sub-systems co-located or distributed relative to each other. Storage system 1003 may comprise additional elements, such as a controller, capable of communicating with processing system 1002 or possibly other systems.

Software 1005 may be implemented in program instructions and among other functions may, when executed by processing system 1002, direct processing system 1002 to operate as described with respect to the various operational scenarios, sequences, and processes illustrated herein. For example, software 1005 may include program instructions for implementing the dataset processing environments and platforms discussed herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software or other application software, in addition to or that include insights environment 1006 or signals environment 1009. Software 1005 may also comprise firmware or some other form of machine-readable processing instructions executable by processing system 1002.

In general, software 1005 may, when loaded into processing system 1002 and executed, transform a suitable apparatus, system, or device (of which computing system 1001 is representative) overall from a general-purpose computing system into a special-purpose computing system customized to facilitate enhanced data insight visualization and activity knowledge inference. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Insights environment 1006 or signals environment 1009 each includes one or more software elements, such as OS 1021/1031 and applications 1022/1032. These elements can describe various portions of computing system 1001 with which users, dataset sources, telemetry elements, machine learning environments, or other elements, interact. For example, OS 1021/1031 can provide a software platform on which application 1022/1032 is executed and allows for processing datasets for insights and visualizations, processing data files from various sources to develop activity knowledge and usage modalities, and establish mobile device portability for insight objects, among other functions.

In one example, insight processor 1023 includes dataset handler 1024 and visualization generator 1025. Dataset handler 1024 identifies datasets associated with user data that are newly entered by users and previously stored by users. Dataset handler 1024 can process datasets to identify insights and insight objects for associated with the datasets. Visualization generator 1025 produces data insight objects for a target dataset, the data insight objects comprising graphical visualization portions, data descriptions, object insight portions for presentation to a user, and an object metadata portions that indicates at least a processing lineage used to produce the data insight object. Insight processor 1032 can provide the data insight objects for presentation by an insight interface to the user application, such as over interface system 1007 or interface system 1008. Visualization generator 1025 determines data insight candidates for the target datasets based at least on usage modalities associated with processing one or more past datasets, and establishes content of the data insight candidates according to the target datasets and the usage modalities. Visualization generator 1025 can also associate selected data insight objects and lineage metadata with target datasets for subsequent use on alternative computing devices, such as mobile devices or non-mobile devices.

In another example, activity signals processor 1033 includes usage processor 1034 and knowledge generator 1035. Usage processor 1034 identifies data storage services as sources for usage data related to application usage activity of one or more users, and extracts portions of the usage data that indicate at least the application usage activity for the one or more users. Knowledge generator 1035 applies application usage activity to a knowledge graphing service configured to determine activity signals for the one or more users from among the application usage activity, and store data analysis preferences derived from the activity signals in a knowledge repository. Knowledge generator 1035 interfaces with an insight service, such as insight processor 1023, to produce data insight objects each the data insight object comprising an object insight portion for presentation to a user and an object metadata portion that indicates at least a processing lineage used to produce the data insight object.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. Physical or logical elements of communication interface system 1007 can receive datasets from telemetry sources, transfer datasets and control information between one or more distributed data storage elements, and interface with a user to receive data selections and provide visualized datasets, among other features.

User interface system 1008 is optional and may include a keyboard, a mouse, a voice input device, a touch input device for receiving input from a user. Output devices such as a display, speakers, web interfaces, terminal interfaces, and other types of output devices may also be included in user interface system 1008. User interface system 1008 can provide output and receive input over a network interface, such as communication interface system 1007. In network examples, user interface system 1008 might packetize display or graphics data for remote display by a display system or computing system coupled over one or more network interfaces. Physical or logical elements of user interface system 1008 can receive datasets or insight selection information from users or other operators, and provide processed datasets, insight objects, activity knowledge, or other information to users or other operators. User interface system 1008 may also include associated user interface software executable by processing system 1002 in support of the various user input and output devices discussed above. Separately or in conjunction with each other and other hardware and software elements, the user interface software and user interface devices may support a graphical user interface, a natural user interface, or any other type of user interface.

Communication between computing system 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A method of providing a data visualization framework for a mobile computing device, the method comprising in an insight service remote from the mobile computing device, determining data insight candidates for presentation on the mobile computing device that describe analysis of a target dataset, where the data insight candidates are determined based at least on data analysis preferences associated with processing one or more past datasets, where each of the data insight candidates includes at least one insight object directed to the target dataset and described by object metadata that indicates at least a processing lineage used to produce the at least one insight object. The method includes, in the insight service, selecting a presentation detail level for displaying the data insight candidates on the mobile computing device based at least on properties of the mobile computing device, based at least on the presentation detail level, generating one or more insight views for presentation on the mobile computing device, and transferring the one or more insight views for delivery to the mobile computing device.

Example 2

The method of Example 1, further comprising, in the insight service, transferring a list indicating the data insight candidates for display on the mobile computing device, and receiving a user selection of a selected one of the data insight candidates, and responsive to the user selection, transferring the one or more insight views associated with the selected one of the data insight candidates for delivery to the mobile computing device.

Example 3

The method of Examples 1-2, further comprising responsive to the user selection, in the insight service, maintaining the object metadata associated with the selected one of the data insight candidates while rendering a view of the selected one of the data insight candidates for transfer to the mobile computing device without the object metadata associated with the selected one of the data insight candidates.

Example 4

The method of Examples 1-3, further comprising responsive to the user selection, in the insight service, storing the object metadata in association with the selected one of the data insight candidates for display of the selected one of the data insight candidates on a different computing device than the mobile computing device.

Example 5

The method of Examples 1-4, further comprising, in the insight service, receiving the properties of the mobile computing device that indicate to the insight service a display form factor comprising a size and resolution of a display screen of the mobile computing device, and selecting the presentation detail level for displaying the data insight candidates on the mobile computing device based at least on the display form factor, where the presentation detail level comprises selecting rendering processes for associated graphical portions of the one or more data insight candidates based on the display form factor of the mobile computing device.

Example 6

The method of Examples 1-5, further comprising in the insight service, receiving the properties of the mobile computing device that indicate to the insight service a network bandwidth status of the mobile computing device, and selecting the presentation detail level for displaying the data insight candidates on the mobile computing device based at least on the network bandwidth status of the mobile computing device, where the presentation detail level comprises selecting rendering processes for associated graphical portions of the one or more data insight candidates based on the network bandwidth status of the mobile computing device.

Example 7

The method of Examples 1-6, where generating the one or more insight views for presentation on the mobile computing device comprises providing for a paged view of the data insight candidates on the mobile computing device by which a user can swipe through each of the data insight candidates and select at least one of the data insight candidates via a touchscreen portion of the mobile computing device.

Example 8

The method of Examples 1-7, further comprising in the insight service, responsive a user alteration of the target dataset on the mobile computing device, processing the alteration of the target dataset with a processing lineage of at least one of the data insight candidates to produce at least one updated data insight candidate, and transferring a view of the at least one updated data insight candidate for delivery to the mobile computing device.

Example 9

A data visualization framework for a mobile computing platform, comprising one or more computer readable storage media, a processing system operatively coupled with the one or more computer readable storage media, and program instructions stored on the one or more computer readable storage media. Based on being read and executed by the processing system, the program instructions direct the processing system to at least determine data insight candidates for presentation via the mobile computing platform that describe analysis of a target dataset, where the data insight candidates are determined based at least on data analysis preferences associated with processing one or more past datasets, where each of the data insight candidates includes at least one insight object directed to the target dataset and described by object metadata that indicates at least a processing lineage used to produce the at least one insight object, select a presentation detail level for displaying the data insight candidates on the mobile computing platform based at least on properties of the mobile computing platform. Based at least on the presentation detail level, the program instructions direct the processing system to generate one or more insight views for presentation on the mobile computing platform, and transfer the one or more insight views for delivery to the mobile computing platform.

Example 10

The data visualization framework of Examples 9, comprising further program instructions, based on being executed by the processing system, direct the processing system to at least transfer a list indicating the data insight candidates for display on the mobile computing platform, and receive a user selection of a selected one of the data insight candidates, and responsive to the user selection, transfer the one or more insight views associated with the selected one of the data insight candidates for delivery to the mobile computing platform.

Example 11

The data visualization framework of Examples 9-10, comprising further program instructions, based on being executed by the processing system, direct the processing system to at least, responsive to the user selection, maintain the object metadata associated with the selected one of the data insight candidates while rendering a view of the selected one of the data insight candidates for transfer to the mobile computing platform without the object metadata associated with the selected one of the data insight candidates.

Example 12

The data visualization framework of Examples 9-11, comprising further program instructions, based on being executed by the processing system, direct the processing system to at least, responsive to the user selection, store the object metadata in association with the selected one of the data insight candidates for display of the selected one of the data insight candidates on a different computing device than the mobile computing platform.

Example 13

The data visualization framework of Examples 9-12, comprising further program instructions, based on being executed by the processing system, direct the processing system to at least receive the properties of the mobile computing platform that indicate to the insight service a display form factor comprising a size and resolution of a display screen of the mobile computing platform, and select the presentation detail level for displaying the data insight candidates on the mobile computing platform based at least on the display form factor, where the presentation detail level comprises selecting rendering processes for associated graphical portions of the one or more data insight candidates based on the display form factor of the mobile computing platform.

Example 14

The data visualization framework of Examples 9-13, comprising further program instructions, based on being executed by the processing system, direct the processing system to at least receive the properties of the mobile computing platform that indicate to the insight service a network bandwidth status of the mobile computing platform, and select the presentation detail level for displaying the data insight candidates on the mobile computing platform based at least on the network bandwidth status of the mobile computing platform, where the presentation detail level comprises selecting rendering processes for associated graphical portions of the one or more data insight candidates based on the network bandwidth status of the mobile computing platform.

Example 15

The data visualization framework of Examples 9-14, where generating the one or more insight views for presentation on the mobile computing platform comprises providing for a paged view of the data insight candidates on the mobile computing platform by which a user can swipe through each of the data insight candidates and select at least one of the data insight candidates via a touchscreen portion of the mobile computing platform.

Example 16

The data visualization framework of Examples 9-15, comprising further program instructions, based on being executed by the processing system, direct the processing system to at least, responsive a user alteration of the target dataset on the mobile computing platform, process the alteration of the target dataset with a processing lineage of at least one of the data insight candidates to produce at least one updated data insight candidate, and transfer a view of the at least one updated data insight candidate for delivery to the mobile computing platform.

Example 17

A method of operating a spreadsheet application on a mobile computing device, the method comprising presenting an insight interface to the spreadsheet application that indicates one or more data analysis options for a target dataset presented in a user interface to the spreadsheet application. Responsive to a user selection indicating an insight analysis is requested for the target dataset, the method includes interfacing with an insight service remote from the mobile computing device that produces one or more data visualization objects related to the target dataset, the data visualization objects each comprising a graphical visualization portion and an object metadata portion that indicates a processing lineage used to produce the graphical visualization portion, and presenting the one or more data visualization objects in the insight interface to the spreadsheet application. Responsive to a further user selection indicating a selected data visualization object among the one or more data visualization objects, the method includes associating, in the insight service, the selected data visualization object with the target dataset for subsequent use on another computing device, the selected data visualization object comprising an associated graphical visualization portion and an associated processing lineage used to produce the associated graphical visualization portion.

Example 18

The method of Example 17, further comprising indicating to the insight service a display form factor of the mobile computing device, and interfacing with the insight service to produce the one or more data visualization objects related to the target dataset by at least selecting the associated graphical visualization portions for the one or more data visualization objects based on the display form factor of the mobile computing device, and producing the object metadata portions of the one or more data visualization objects to support at least the display form factor of the mobile computing device and another display form factor for the other computing device, where the display form factor of the mobile computing device comprises a size and resolution of a display screen of the mobile computing device different than a size and resolution of a display screen of the other computing device.

Example 19

The method of Examples 17-18, further comprising indicating to the insight service a network bandwidth status of the mobile computing device, and interfacing with the insight service to produce the one or more data visualization objects related to the target dataset by at least selecting rendering processes for the associated graphical visualization portions of the one or more data visualization objects based on the network bandwidth status of the mobile computing device.

Example 20

The method of Examples 17-19, further comprising interfacing with the insight service to produce the one or more data visualization objects related to the target dataset by at least indicating to the insight service a storage location of the target dataset in a distributed storage system, and initiating the insight analysis with the insight service, where the insight analysis produces the one or more data visualization objects based at least on processing the target dataset against activity signals derived from past usage modalities associated with data stored on at least the distributed storage system.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A method of operating a data insight system, the method comprising:
   determining derived data analysis preferences based at least on usage modalities for past data analysis activities of a user or organization associated with the user;
   determining a data insight object for a target dataset based on the derived data analysis preferences, wherein the data insight object comprises:
      an object portion representing first content as a data insight,
      one or more metadata portions indicating a processing lineage that provides data indicating an active record of data processing steps applied to generate the first content including one or more of: processing operations, functions and formulae, and
      a graphical user interface (GUI) element posing a question about the first content of the data insight;
   generating the data insight object at different presentation levels based at least on an evaluation of device properties identified for a user computing device that is to display the representation of the data insight object, wherein the different presentation levels comprise:
      a first presentation level that includes the object portion and the GUI element, and
      a second presentation level that includes a metadata portion, of the one or more metadata portions, as second content indicating the processing lineage that is displayable, upon selection of the GUI element posing the question about the first content of the data insight;
   transferring, to the user computing device, data for rendering of the data insight object at the first presentation level;
   receiving, from the user computing device, an indication of a selection of the GUI element posing the question about the content of the data insight; and
   in response to receiving the indication of the selection of the GUI element, transferring, to the user computing device, data for rendering of the data insight object at the second presentation level.

2. The method of claim 1, further comprising: maintaining the one or more metadata portions indicating the processing lineage in a distributed storage remote from the user computing device, and wherein the transferring of the data for rendering of the data insight object at the first presentation level and the second presentation level each respectively comprise: retrieving, from the distributed storage, the data for rendering of the data insight object at the first presentation level and the data for rendering of the data insight at the second presentation level.

3. A data visualization apparatus, comprising:
   a memory storing computer-executable instructions;
   a processing system operatively coupled with the memory that is configured to execute the computer-executable instructions causing the processing system to:
      determine derived data analysis preferences based at least on usage modalities for past data analysis activities of a user or organization associated with the user;
      determine a data insight object for a target dataset based on the derived data analysis preferences, wherein the data insight object comprises:
         an object portion representing first content as a data insight,
         one or more metadata portions indicating a processing lineage that provides data indicating an active record of data processing steps applied to generate the first content including one or more of: processing operations, functions and formulae, and a graphical user interface (GUI) element posing a question about the first content of the data insight;
generate the data insight object at different presentation levels based at least on an evaluation of device properties identified for a user computing device that is to display the representation of the data insight object, wherein the different presentation levels comprise:
a first presentation level that includes the object portion and the GUI element, and
a second presentation level that includes a metadata portion, of the one or more metadata portions, as second content indicating the processing lineage that is displayable, upon selection of the GUI element posing the question about the first content of the data insight;
transfer, to the user computing device, data for rendering of the data insight object at the first presentation level;
receive, from the user computing device, an indication of a selection of the GUI element posing the question about the content of the data insight; and
in response to a receipt of the indication of the selection of the GUI element, transfer, to the user computing device, data for rendering of the data insight object at the second presentation level.

4. The data visualization apparatus of claim 3, wherein execution of the computer-executable instructions further cause the processing system to: maintain the one or more metadata portions indicating the processing lineage in a distributed storage remote from the user computing device, and wherein transfer of the data for rendering of the data insight object at the first presentation level and the second presentation level each respectively comprise: retrieving, from the distributed storage, the data for rendering of the data insight object at the first presentation level and the data for rendering of the data insight at the second presentation level.

5. A method comprising:
determining derived data analysis preferences based at least on usage modalities for past data analysis activities of a user or organization associated with the user;
determining a data insight object for a target dataset based on the derived data analysis preferences, wherein the data insight object comprises:
an object portion representing first content as a data insight,
one or more metadata portions indicating a processing lineage that provides data indicating an active record of data processing steps applied to generate the first content including one or more of: processing operations, functions and formulae, and
a graphical user interface (GUI) element posing a question about the first content of the data insight;
generating the data insight object at different presentation levels based at least on an evaluation of device properties identified for a user computing device that is to display the representation of the data insight object, wherein the different presentation levels comprise:
a first presentation level that includes the object portion and the GUI element, and
a second presentation level that includes a metadata portion, of the one or more metadata portions, as second content indicating the processing lineage that is displayable, upon selection of the GUI element posing the question about the first content of the data insight;
rendering, for presentation, the data insight object at the first presentation level;
receiving a selection of the GUI element posing the question about the content of the data insight; and
in response to a receipt of the selection of the GUI element, rendering the data insight object at the second presentation level.

6. The method of claim 1, wherein the data for rendering of the data insight object at the second presentation level comprises a visual representation of a function used to generate the first content of the data insight.

7. The method of claim 1, wherein the data for rendering of the data insight object at the second presentation level comprises a visual representation of a formulae used to generate the first content of the data insight.

8. The method of claim 1, wherein the data for rendering of the data insight object at the second presentation level comprises a visual representation of a processing operation used to generate the first content of the data insight.

9. The data visualization apparatus of claim 3, wherein the data for rendering of the data insight object at the second presentation level comprises a visual representation of a function used to generate the first content of the data insight.

10. The data visualization apparatus of claim 3, wherein the data for rendering of the data insight object at the second presentation level comprises a visual representation of a formulae used to generate the first content of the data insight.

11. The data visualization apparatus of claim 3, wherein the data for rendering of the data insight object at the second presentation level comprises a visual representation of a processing operation used to generate the first content of the data insight.

12. The method of claim 5, wherein the data for rendering of the data insight object at the second presentation level comprises a visual representation of a function used to generate the first content of the data insight.

13. The method of claim 5, wherein the data for rendering of the data insight object at the second presentation level comprises a visual representation of a formulae used to generate the first content of the data insight.

14. The method of claim 5, wherein the data for rendering of the data insight object at the second presentation level comprises a visual representation of a processing operation used to generate the first content of the data insight.

15. The method of claim 1, wherein the evaluation of device properties identified for the user computing device, used in the generating of the data insight object at the different presentation levels, comprises evaluating a display configuration of the user computing device.

16. The method of claim 15, wherein the generating of the data insight object at the different presentation levels comprises determining to generate the data insight object at the different presentation levels based on an evaluation of display size of the user computing device.

17. The data visualization apparatus of claim 3, wherein the evaluation of device properties identified for the user computing device, used in the generation of the data insight object at the different presentation levels, comprises an evaluation of a display configuration of the user computing device.

18. The data visualization apparatus of claim 17, wherein generation of the data insight object at the different presentation levels comprises determining to generate the data insight object at the different presentation levels based on an evaluation of a display size of the user computing device.

19. The method of claim 5, wherein the evaluation of device properties identified for the user computing device, used in the generating of the data insight object at the different presentation levels, comprises evaluating a display configuration of the user computing device.

20. The method of claim 19, wherein the generating of the data insight object at the different presentation levels comprises determining to generate the data insight object at the different presentation levels based on an evaluation of a display size of the user computing device.

* * * * *